(12) United States Patent
Cohen et al.

(10) Patent No.: US 7,435,503 B2
(45) Date of Patent: *Oct. 14, 2008

(54) PLANAR MEMBRANELESS MICROCHANNEL FUEL CELL

(75) Inventors: Jamie Lee Cohen, Ithaca, NY (US);
David James Volpe, Ithaca, NY (US);
Daron A. Westly, Ithaca, NY (US);
Alexander Pechenik, Ithaca, NY (US);
Hector D. Abruna, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/150,622

(22) Filed: Jun. 10, 2005

(65) Prior Publication Data

US 2006/0003217 A1    Jan. 5, 2006

Related U.S. Application Data

(60) Provisional application No. 60/579,075, filed on Jun. 10, 2004, provisional application No. 60/626,440, filed on Nov. 19, 2004.

(51) Int. Cl.
*H01M 8/04* (2006.01)
(52) U.S. Cl. .............................. 429/38; 429/34; 429/39
(58) Field of Classification Search ........................ None
See application file for complete search history.

(56) References Cited

U.S. PATENT DOCUMENTS 5,534,120 A    7/1996  Ando et al.

6,713,206 B2    3/2004  Markoski et al.

(Continued)

FOREIGN PATENT DOCUMENTS

WO    WO 03/011443 A2    2/2003

(Continued)

OTHER PUBLICATIONS

J.L. Cohen et al., Fabrication and Preliminary Testing of a Planar Membraneless Microchannel Fuel Cell, www.sciencedirect.com, 2004, Journal of Power Sources, 139, pp. 98-105.*

(Continued)

*Primary Examiner*—Jonathan Crepeau
(74) *Attorney, Agent, or Firm*—Wilson Sonsini Goodrich & Rosati

(57) ABSTRACT

A planar microfluidic membraneless flow cell. The design eliminates the need for a mechanical membrane, such as a polyelectrolyte membrane (PEM) in a fuel cell, by providing a flow channel in which laminar flow regimes exist in two fluids flowing in mutual contact to form a "virtual interface" in the flow channel. In the flow cell, diffusion at the interface is the only mode of mass transport between the two fluids. In a fuel cell embodiment, a planar design provides to large contact areas between the two streams, which are fuel and oxidant streams, and between each stream and a respective electrode. In some embodiments, silicon microchannels, of fixed length and variable width and height, have been used to generate power using formic acid as fuel and oxygen as oxidant. Power densities on the order of 180 $\mu W/cm^2$ have been obtained using this planar design.

7 Claims, 12 Drawing Sheets

U.S. PATENT DOCUMENTS

| | | | |
|---|---|---|---|
| 2004/0058217 A1 | 3/2004 | Ohlsen et al. | |
| 2004/0072047 A1 | 4/2004 | Markoski et al. | |
| 2004/0262223 A1 | 12/2004 | Strook et al. | |
| 2005/0084737 A1* | 4/2005 | Wine et al. | 429/38 |
| 2006/0210867 A1 | 9/2006 | Kenis et al. | |
| 2006/0228622 A1 | 10/2006 | Cohen et al. | |
| 2008/0008911 A1 | 1/2008 | Stroock et al. | |

FOREIGN PATENT DOCUMENTS

| | | |
|---|---|---|
| WO | WO 03/011443 A3 | 7/2003 |
| WO | WO 03/061037 | 7/2003 |

OTHER PUBLICATIONS

P.J. A. Kenis et al., Microfabrication Inside Capillaries Using Multiphase Laminar Flow Patterning, www.sciencemag.org, vol. 285, Jul. 2, 1999, pp. 83-85.

R.F. Ismagilov et al., Experimental and Theoretical Scaling Laws for Transverse Diffusive Broadening in Two-phase Laminar Flows in Microchannels, American Institute of Physics, Applied Physics Letters, vol. 76, No. 17, 24, Apr. 2000, pp. 2376-2378.

P.J.A. Kenis et al., Fabrication Inside Microchannels Using Fluid Flow, American Chemical Society, vol. 33, No. 12, 2000, pp. 841-847.

A.D. Stroock et al., Patterning Electro-osmotic Flow with Patterned Surface Charge, The American Physical Society, vol. 84, No. 15, Apr. 10, 2000, pp. 3314-3317.

R.Ferrigno et al., Membraneless Vanadum Redox Fuel Cell Using Laminar Flow, JACS communication, vol. 124, No. 44, 2002, pp. 12930-12931.

E.R.Choban et al., Microfluidic Fuel Cells That Lack a PEM, Proceedings of the Power Sources Conference 2002, 40th, pp. 317-319.

E.R. Choban et al., Membraneless Fuel Cell Based on Laminar Flow, Fuel Cell Science, Engineering and Technology, 2003, pp. 261-265.

J. Yeom et al.,A Silicon Microfabricated Direct Formic Acid Fuel Cell, Fuel Cell Science, Engineering and Technology, 2003, pp. 267-272.

E.R. Choban et al., Microfluidic Fuel Cell Based on Laminar Flow, www.scienedirect.com, 2004, Journal of Power Sources 128, 2004, pp. 54-60.

J.L. Cohen et al., Fabrication and Preliminary Testing of a Planar Membraneless Microchannel Fuel Cell, www.sciencedirect.com, 2004, Journal of Power Sources, 139, pp. 96-105.

J.L. Cohen et al, A Dual Electrolyte H2/O2 Planar Membraneless Microchannel Fuel Cell System with Open Circuit Potentials in Excess of 1.4V, American Chemical Society, 2005, , Langmuir, vol. 21, No. 8, 2005, pp. 3544-3550.

Acres, G.J.K. 2001. Recent Advances in Fuel Cell Technology and Its Applications. *Journal of Power Sources* 100: 60-66.

Bard, Allen J. et al. 2001. Electrochemical Methods: Fundamentals and Applications, 2nd ed. John Wiley & Sons, Inc.

Bommarito, G.M. et al. 1992. In Situ Monitoring of Electrochemically Induced Roughening with the Crystal Truncation Rod Technique. *J. Phys. Chem., American Chemical Society* 96 (8): 3416-3419.

Choban, Eric R. et al. 2005. Membraneless laminar flow-based micro fuel cells operating in alkaline, acidic, and acidic/alkaline media. *Electrochimica Acta* 50: 5390-5398.

Josserand, Jacques et al. 2003. Contact Galvani potential differences at liquid|liquid interfaces Part II. Contact diffusion potentials in microsystems. *Journal of Electroanalytical Chemistry* 546: 1-13.

Kamholz, Andrew Evan et al. 1999. Quantitative Analysis of Molecular Interaction in a Microfluidic Channel: The T-Sensor. *Anal. Chem, American Chemical Society.* 71 (23): 5340-5347.

Lagger, Gregoire, et al. 2003. Hydro-voltaic cells Part I. Concentration cells. *Journal of Electroanalytical Chemistry* 545: 1-6.

Larminie, James et al. 2000. Fuel Cell Systems Explained. Chichester: John Wiley & Sons, Ltd.

Smith, Sean P.E. et al. 1998. Effects of the Electrolyte Identity and the Presence of Anions on the Redox Behavior of Irreversibly Adsorbed Bismuth on Pt(111). *J. Phys. Chem. B, American Chemical Society* 102 (18): 3506-3511.

Volpe, David James. A Paradigm Shift: Ordered Intermetallic Phases as Fuel Cell Electrocatalysts (2005) (Ph.D. thesis, Cornell University) (on file with Cornell University Library).

Cohen et al., U.S. Appl. No. 11/285,509 "Dual Electrolyte Membraneless Microchannel Fuel Cells", filed on Nov. 21, 2005.

Kirtland, et al. Mass Transfer to Reactive Boundaries from Steady Three-Dimensional Flows in Microchannels. Physics of Fluids. 2006; 18: 073602.

Stone, et al. Engineering flows in small devices: Microfluidics toward a lab-on-a-chip. Annual Review of Fluid Mechanics. 2004; 36:381-411.

Stroock, et al. Chaotic mixer for microchannels. Science. 2002; 295:647-651.

Stroock, et al. Investigation of the staggered herringbone mixer with a simple analytical model. Philosophical Transactions of the Royal Society: Series A: Mathematical, Physical and Engineering Sciences. 2004;362;971-986.

Stroock, et al. Patterning flows using grooved surfaces. Analytical Chemistry. 2002; 74:5306-5312.

Weigl, et al. Microfluidic Diffusion-Based Separation and Detection. Science. 1999; 283:346-347.

Yeom, et al. Microfabrication and characterization of a silicon-based millimeter scale, PEM fuel cell operating with hydrogen, methanol, or formic acid. Sensors and Actuators B-Chemical. 2005; 107:882-891.

* cited by examiner

PLANAR MEMBRANELESS MICROCHANNEL FUEL CELL

CROSS-REFERENCE TO RELATED APPLICATIONS

This application claims priority to and the benefit of U.S. provisional patent application Ser. No. 60/579,075, filed Jun. 10, 2004, entitled "Planar Membraneless Microchannel Fuel Cell," and claims priority to and the benefit of U.S. provisional patent application Ser. No. 60/629,440, filed Nov. 19, 2004, entitled "Planar Membraneless Microchannel Fuel Cell," which applications are incorporated herein by reference in their entirety.

STATEMENT REGARDING FEDERALLY FUNDED RESEARCH OR DEVELOPMENT

The invention described herein was made in the performance of work under Army Research Office contract DAAD19-03-C-0100, under NSF contract ACT-0346377, and under NSF Grant ECS-0335765, and is subject to the provisions of Public Law 96-517 (35 U.S.C. §202) in which the Contractor has elected to retain title.

FIELD OF THE INVENTION

The invention relates to microfluidic flow cells in general and particularly to a microfluidic flow cell that provides a large "virtual interface" between a plurality of laminar flows, and that finds utility, inter alia, as a fuel cell.

BACKGROUND OF THE INVENTION

Recently, there has been much emphasis on the development of novel fuel cell technologies as portable high energy density power sources for consumer electronics, military applications, medical diagnostic equipment, and mobile communication. These systems must be lightweight, energy efficient, and able to operate for long periods of time without refueling. This interest in miniaturization of power sources has been expanded to microsystems for powering MEMs and related devices, such as "lab-on-a-chip" systems and micropumping assemblies. Merging the development of fuel cells with microtechnology has led to the study of micro-fuel cells and their application to micro-devices, as well as to a myriad of portable systems. Additionally, the Department of Defense (DOD) has frequently expressed a need for high-energy, lightweight power sources for the soldier. The power needs of the individual warrior is the main driver behind the DOD search for power sources that are lighter, can deliver more power, have longer running times and have fewer overall logistic problems. Today's soldier is burdened with 16 different batteries weighing 2.5 pounds. With the new Army vision of the Land Warrior, version 1, the total number of batteries should be reduced to 4 and the weight should be reduced to 2.0 pounds. In the future, an Army soldier is expected to have >1 KW of power on a 72-hour mission carrying even less weight. Such goals can only be met by a combination of rechargeable batteries and fuel cells.

Micro fuel cells, which are similar to conventional low temperature fuel cells, rely on a polymer electrolyte membrane (PEM; part of the membrane electrode assembly) as an ionic conductor (for generated protons) and as a barrier for separating the oxidizer and fuel. Either or a variety of simple organic fuels, such as methanol or ethanol, can be used as a fuel. The oxidizer is typically oxygen from air.

One of the most challenging aspects of the miniaturization of fuel cells is the PEM, which suffers from numerous problems including: drying out of the membrane (especially at high operating temperatures), fuel crossover into the oxidizer, in addition to the high expense typically associated with membrane development. All of these problems are further compounded by the need to decrease the thickness (further increasing the complication of the network structure) of the PEM when designing a micro-fuel cell. Incorporation of a PEM has been achieved in a number of micro-fuel cells studied to date. A number of these are biofuel cells. Recently, there have also been a number of biofuel cells that employ enzymes as catalysts at both the anode and cathode surfaces in order to achieve some degree of selectivity to the fuel/oxidizer thus decreasing the problem of fuel crossover and eliminating the need for a PEM. While these enzymatic redox systems can provide the desired selectivity, they typically generate very low power and suffer from all of the problems attendant to the use of enzymes, with long-term stability being especially problematic. The PEM also takes up much of the space in the non-enzymatic micro-fuel cells being developed, thus limiting the size of the final device. Despite the significant advances in PEM fuel cells that have been achieved in the last decade, there are still a number of unresolved issues that have limited their use. The polymer electrolyte membrane is an expensive and often unreliable component of PEM fuel cells. Thus, one of the more serious complicating factors (among numerous others) in the miniaturization of fuel cells has been the instability, under operating conditions, of the membrane electrode assembly, which incorporates the proton exchange membrane.

The dimensions of the fuel cell can be reduced, the time and effort required for fabrication and system integration can be reduce, and cost can possibly be reduced by elimination of the PEM, as well as eliminating the need for enzymatic selectivity, in micro-fuel cell designs.

Currently, laminar flow has been employed in developing micro-fuel cells. It has been demonstrated that laminar flow can be used to create a micro-fuel cell with a diffusive interface as the membrane, thus eliminating the need for a PEM. One design is based on a Y-shaped microchannel injected with two fuels side by side and is described in a paper by Choban et al. Electrodes whose areas were enhanced with nanoparticles of Pt were deposited in a two-step process requiring a complex evaporation step and subsequent electrodeposition step. These electrodes were positioned on one side (the bottom) of the microchannel, separated by a gap, to form the anode and cathode, respectively. However, the complicated evaporation techniques necessary, fabrication limitations, as well as the lack of versatility of this micro-fuel cell platform make this design somewhat impractical. Moreover, as the size of the interface between the two fuels is defined by the depth and length of the channel, the interface area remains the same no matter how wide the channel is made. In one previously reported device, the depth of the deepest channel described was 200 microns, so for each millimeter of channel length, there is only 0.2 mm$^2$ of interface area (0.2 mm depth×1 mm length). The interface area per unit of fluid volume (mm$^3$) can also be calculated. The width of the channel is described as being 2 mm. Therefore, there is 0.4 mm$^3$ (0.2 mm depth×1 mm length×2 mm width) of total fluid per millimeter of channel length and the interface area per cubic millimeter is 0.5 mm$^2$ (0.2 mm$^2$/0.4 mm$^3$). The only way to increase the interface area is by increasing channel depth (which may be difficult or costly to achieve using certain manufacturing techniques such as photolithography [which has difficulty producing large vertical walls] or to do without at the same time increasing channel length) or channel length (the maximum useful length may be limited by the dynamics of parallel and laminar flow.

U.S. Pat. No. 6,713,206, issued on Mar. 30, 2004 to Markoski et al. (hereinafter "'206 patent") and U.S. Patent Publication No. 20040072047, published Apr. 15, 2004, also to Markoski et al. (hereinafter "'72047 Publication"), teach the use of laminar flow induced dynamic conducting interfaces for use in micro-fluidic electrochemical cells generally, including batteries, fuel cells, and photoelectric cells. In the approach described in the '206 patent, the laminar flow regime is instituted by injecting two fluids in mutually opposed injection geometry. The '206 patent teaches that "[a] T-junction (FIG. 4A) brings two miscible streams together in a laminar flow, which is maintained without turbulent mixing. In contrast, introducing the two streams in an arrow-type junction (FIG. 4B) produces turbulent flow and subsequent mixing." The '206 patent does not suggest that any angles of relative orientation of the arrow junction are acceptable to produce laminar flows, but that only mutually opposed flows should be used. However, in the '72047 Publication, a laminar flow fuel cell structure is described which incorporates a Y-shaped channel. The structure used in the '206 patent for testing purposes that are reported in the patent involved electrochemical cells in which electrodes measuring approximately 0.125 mm thickness×20 mm length×3 mm width were placed in side-by-side configuration with approximately 5 mm gap between them, as shown in The '206 patent FIG. 7. In the examples described in the '206 patent, using the geometry of FIG. 7, a laminar flow regime appears to have been set up over an area of some centimeters in length by a depth of the thickness of a glass cover slip, which thickness dimension is not reported. Sources of supply for glass cover slips having thicknesses in the range of about 0.1 mm to 0.4 mm are readily located on the Internet. Even assuming a thickness of 0.4 mm, the laminar flow interface that is described in the '206 Patent in the examples provided would be no larger than 0.4 mm=0.04 cm height×20 mm=2 cm length, or approximately 0.08 cm$^2$ in area, which is quite small. The interface area between the two fluids per millimeter of channel length as they flow in contact through the laminar flow channel can be calculated for this device using dimensions given in the '206 patent as 0.4 mm$^2$ (0.4 mm depth×1 mm length) per millimeter of channel length. The interface area per unit volume can also be calculated. Assuming the channel width is at least 11 mm (the bottom of the channel has two electrode strips side by side with a 5 mm gap between them, and the width of the two electrodes is described as 3 mm each), there is 4.4 mm$^3$ of fluid (0.4 depth mm×11 mm width×1 mm length) per millimeter of channel length. Therefore, the interface area per unit volume for the device described in the '206 patent is 0.91 mm$^2$ (0.4 mm$^2$ area×4.4 mm$^3$ volume) per cubic millimeter of fluid. The device shown in FIG. 13 of the '72047 Publication is described as having a 1 mm by 1 mm channel. The interface area in this device per millimeter of channel length is therefore 1 mm$^2$ and the interface area per cubic millimeter of fluid volume is 1 mm$^2$ (volume=1 mm width×1 mm length×1 mm depth). Since the amount of a substance that can be caused to react is proportional to the area, of the interface between the two laminar flows, one problem that needs to be solved is how to arrange for larger areas of the interface between such laminar flows and also to increase the interface area without also increasing the volume of fluid. There have also been studies for the development of sensors taking advantage of laminar flow, as well as using the diffusive interface for microfabrication of small wires or polymer strands inside microchannels. Moreover, much theoretical work has been done in order to understand the mixing behavior of two solutions flowing in a laminar fashion side by side.

Those familiar with fluid dynamics are aware that fluids flowing in a channel without being stirred, flow in a laminar flow regime when the Reynolds number is less than about 2100, and that they flow in a turbulent regime when the Reynolds number is higher than about 2100. The Reynolds number is a dimensionless number given by $$N_{Re}=\rho v L/\mu,$$

where $\rho$ (rho) is the density of the fluid, v is the linear velocity, L is a characteristic length, and $\mu$ (mu) is the viscosity of the fluid. The Reynolds number is defined as the ratio of inertial forces to viscous forces, and can be computed using a variety of different units of measure, so long as the result is a dimensionless value. Other dimensionless numbers that can be used to characterize flowing fluids are the Schmidt number $N_{Sc}$ and the Peclet number $N_{Pe}$.

There is a need for a structure in which a laminar flow interface having appreciable areas can be produced, in which significant amounts of reagents can be controllably reacted.

SUMMARY OF THE INVENTION

In one aspect, the invention relates to a flow cell structure useful for providing laminar flow regimes in a plurality of fluids flowing in mutual contact in a laminar flow channel. The flow cell structure comprises a laminar flow channel defined within a flow cell structure; at least two entrance apertures defined within the flow cell structure, a first entrance aperture configured to admit a first fluid flow into the laminar flow channel and a second entrance aperture configured to admit a second fluid flow into the laminar flow channel, the first entrance aperture and the second entrance aperture configured to provide respective entry of the first fluid flow and the second fluid flow from the same side of the laminar flow channel; a flow control structure situated adjacent the at least two entrance apertures for admitting the fluid flows into the laminar flow channel, the flow control structure configured to cause each of the fluid flows to flow in a laminar flow regime within the laminar flow channel; and at least one exit aperture defined within the fuel cell structure for permitting the fluids to exit the laminar flow channel; wherein the flow cell structure is configured to provide laminar flow regimes in two fluids flowing in mutual contact in the laminar flow channel. In one embodiment, the first entrance aperture and the second entrance aperture configured to provide respective entry of the first fluid flow and the second fluid flow from the same side of the laminar flow channel. In one embodiment, the flow control structure has at a downstream terminal edge thereof a thickness of not more than 50 microns. In one embodiment, the laminar flow channel is rectangular in cross-section.

In one embodiment, the width of the first entrance aperture and the width of the second entrance aperture are equal. In one embodiment, the width of the first entrance aperture and the width of the second entrance aperture are equal, and are also equal to the width of the laminar flow channel immediately after the entrance apertures. In one embodiment, the width of the first entrance aperture and the width of the second entrance aperture are equal, and are also equal to the width of the entire laminar flow channel.

In one embodiment, there are a first and second diffuser/condenser structures, each transferring a first and second fluid entering through a first and second inlet from a first and second inlet end to a first and second entrance aperture into the laminar flow channel a first and second outlet end. Each of said diffuser/condenser structures mechanically diffuses or condenses the width of its respective fluid from the width of its respective fluid at its respective inlet end to the width of its respective entrance aperture at its outlet end. In one embodiment, the width of the two diffuser/condenser structures at their inlet ends can be different from each other and have any width, but at their outlet ends at their respective entrance apertures, the width of the two diffuser/condenser structures is the same, and is optionally and preferentially equal to the width of the beginning of the laminar flow channel. In one embodiment, the widths of the diffuser/condenser structures at the entrance aperture, of the entrance aperture and of the laminar flow channel at the entrance aperture are equal. In one embodiment, the side walls of the first diffuser/condenser structures at its outlet end is aligned with the side walls of the second diffuser/condenser structure at its outlet end. In one embodiment, the side walls of the diffuser/condenser structures at their respective outlet ends are aligned with each other and with the side walls of the laminar flow channel at the entrance apertures.

In one embodiment, the width of the diffuser/condenser structures at their outlet ends is at least three times its depth (i.e., at the entrance apertures—the entrance aperture is at the end of the diffuser/condenser structure and beginning of the laminar flow channel, it is the plane of connection between the two). In one embodiment, the width of the diffuser/condenser structures at the entrance apertures is at least five times its depth. In one embodiment, the width of the diffuser/condenser structures at the entrance apertures is at least ten times its depth.

In one embodiment, the widths of the diffuser/condenser structures at their outlet ends, the entrance aperture, and the laminar flow channel at the entrance aperture are equal, and the width of the diffuser/condenser structures at the entrance apertures is at least three times its depth. In one embodiment, the widths of the diffuser/condenser structures at their outlet ends, the entrance aperture, and the laminar flow channel at the entrance aperture are equal, and the width of the diffuser/condenser structures at the entrance apertures is at least five times its depth. In one embodiment, the widths of the diffuser/condenser structures at their outlet ends, the entrance aperture, and the laminar flow channel at the entrance aperture are equal, and the width of the diffuser/condenser structures at the entrance apertures is at least ten times its depth.

In one embodiment, the width of the diffuser/condenser structures at their outlet ends is at least three times its depth, and the side walls of the diffuser/condenser structures at their respective outlet ends are aligned with each other and with the side walls of the laminar flow channel at the entrance apertures. In one embodiment, the width of the diffuser/condenser structures at the entrance apertures is at least five times its depth, and the side walls of the diffuser/condenser structures at their respective outlet ends are aligned with each other and with the side walls of the laminar flow channel at the entrance apertures. In one embodiment, the width of the diffuser/condenser structures at the entrance apertures is at least ten times its depth, and the side walls of the diffuser/condenser structures at their respective outlet ends are aligned with each other and with the side walls of the laminar flow channel at the entrance apertures.

In one embodiment, the side walls of the diffuser/condenser structures are aligned with each other and with the side walls of the laminar flow channel.

In one embodiment, the diffuser/condenser structures are parallel to each other and also to the laminar flow channel. In one embodiment, the diffuser/condenser structures near their outlet ends are parallel to each other. In one embodiment, the diffuser/condenser structures near their outlet ends are parallel to each other and also to the laminar flow channel near the entrance apertures.

In one embodiment, the widths of the first entrance aperture and the width of the second entrance aperture are at least three times the depth of the respective entrance aperture, and the entrance apertures are configured such that a first fluid flowing through the first entrance aperture into the laminar flow channel and a second fluid flowing through the second entrance aperture into the laminar flow channel come into contact along the width dimension. In one embodiment the width of each entrance aperture is at least five times the depth, and the entrance apertures are configured such that a first fluid flowing through the first entrance aperture into the laminar flow channel and a second fluid flowing through the second entrance aperture into the laminar flow channel come into contact along the width dimension. In one embodiment the width of each entrance aperture is at least ten times the depth, and the entrance apertures are configured such that a first fluid flowing through the first entrance aperture into the laminar flow channel and a second fluid flowing through the second entrance aperture into the laminar flow channel come into contact along the width dimension.

In one embodiment, the width of the terminal edge of the flow control structure is the same as the width of the entrance apertures and is at least three times the depth of the entrance apertures. In another embodiment, the width of the terminal edge of the flow control structure is the same as the width of the entrance apertures and is at least five times the depth of the entrance apertures. In yet another embodiment, the width of the terminal edge of the flow control structure is the same as the width of the entrance apertures and is at least ten times the depth of the entrance apertures. In another embodiment, the flow control structure is situated such that its terminal edge has a width that is at least three times the depths of the entrance apertures adjacent to it. In another embodiment, the width of the terminal edge is at least five times the depths of the entrance apertures adjacent to it. In yet another embodiment, the width of the terminal edge of the flow control structure is at least 10 times the depths of the entrance apertures adjacent to it. In another embodiment, the flow control device is situated such that its terminal edge has a width that is at least three times the depths of at least one of the entrance apertures adjacent to it. In another embodiment, the width of the terminal edge is at least five times the depth of at least one of the entrance apertures adjacent to it. In yet another embodiment, the width of the terminal edge of the flow control structure is at least 10 times the depth of at least one of the entrance apertures adjacent to it.

In one embodiment, the first fluid flows from the first diffuser/condenser structure through the first entrance aperture into a first half flow cell of the laminar flow channel and a second fluid flows from the second diffuser/condenser structure through the second entrance aperture into a second half flow cell of the laminar flow channel. In one embodiment, cross-sectional dimensions of the first entrance aperture are the same as the cross-sectional dimensions of the first half flow cell and the cross-sectional dimensions of the second entrance aperture are the same as the cross-sectional dimensions of the second half flow cell. In one embodiment, cross-sectional dimensions of the first entrance aperture are the same as the cross-sectional dimensions of the first half flow cell and the cross-sectional dimensions of the second entrance aperture are the same as the cross-sectional dimensions of the second half flow cell, and the diffuser/condenser structures are parallel to their respective half flow cells at least immediately prior to and after the entrance apertures.

In one embodiment there is a boundary structure between the two diffuser/condenser structures. In one embodiment, the cross-sectional dimensions of the first entrance aperture are the same as the cross-sectional dimensions of the first half flow cell and the cross-sectional dimensions of the second entrance aperture are the same as the cross-sectional dimensions of the second half flow cell, and the boundary structure is tapered and brings the diffuser/condenser structures into being parallel to their respective half flow cells prior to the entrance apertures, and brings the two diffuser/condenser structures closer and closer until the meet when the boundary structure tapers to nothing. In one embodiment, the boundary structure gradually diminishes in thickness until it disappears at the entrance apertures. In one embodiment, the boundary structure forms one wall of each diffuser/condenser structure and both walls formed by the boundary structure are parallel to the opposite walls of the respective diffuser/condenser structures of which they form a wall. In one embodiment, the boundary structure forms one wall of each diffuser/condenser structure and one of the walls formed by the boundary structure is parallel to the opposite wall of the diffuser/condenser structure of which it forms a wall.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
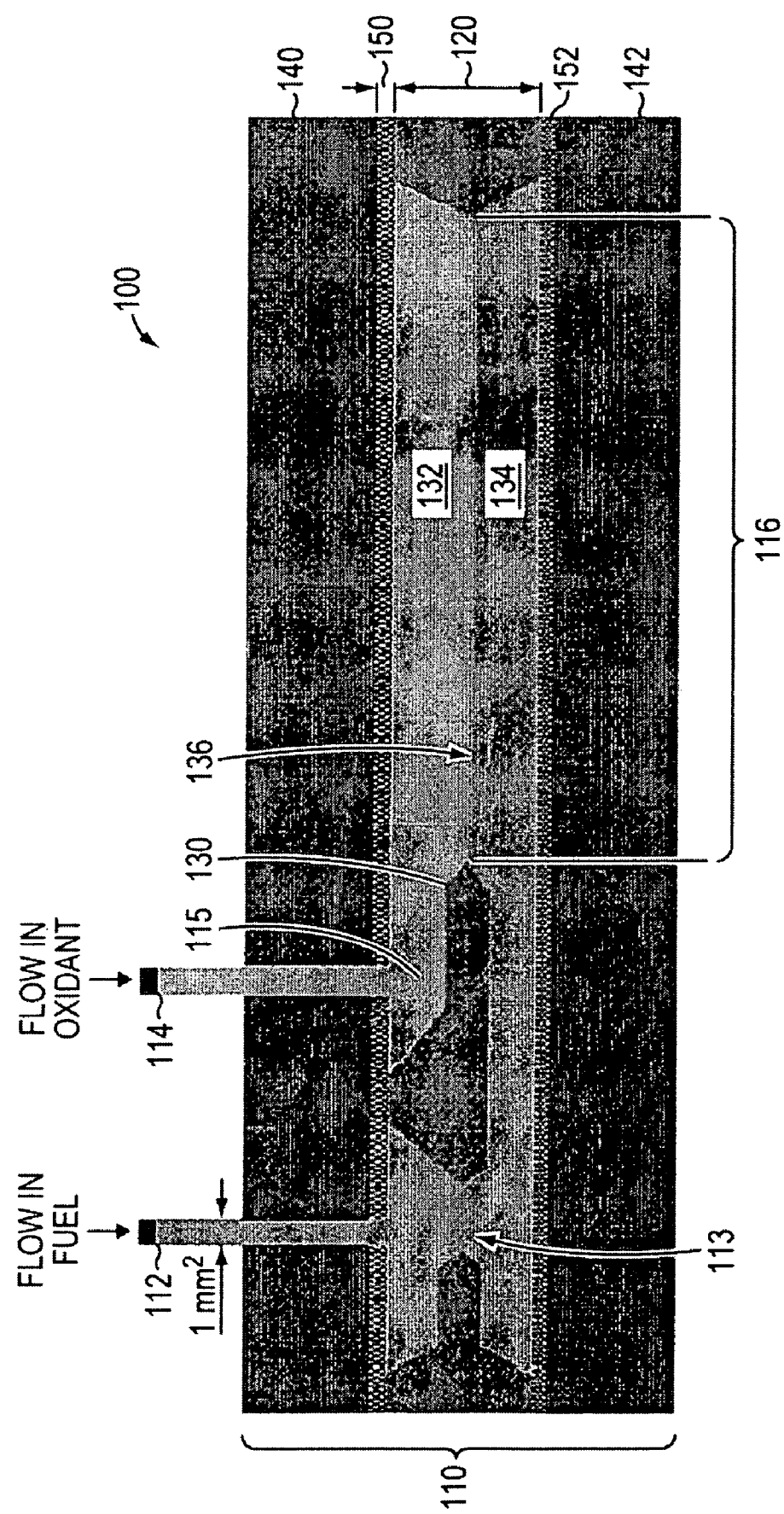
FIG. 1 is a drawing showing a schematic sectional side view of the planar microfluidic membraneless micro-fuel cell, according to principles of the invention.

The invention described herein relates to a planar membraneless microchannel structure. In one embodiment, the structure is useful in constructing a planar membraneless microchannel fuel cell ($PM^2FC$) and for generating electrical power by consuming fuel components (e.g., a substance capable of being oxidized and a substance capable of being an oxidizer) within the structure so that the fuel components are reacted and electrical power is produced that can be extracted from terminals of the fuel cell embodying the planar membraneless microchannel structure. However, the features of the planar membraneless microchannel structure described hereinbelow are also useful in other applications. Examples of other applications include certain kinds of diffusion controlled chemical reactions and applications of those reactions, such as in diagnostic tests; and controlled processing of materials, based on controlled fluid dynamics.

The flow regime described by The '206 patent provides a laminar flow interface having only a small area, which based on the lack of disclosure in The '206 patent, is estimated to be about 0.08 $cm^2$, as previously indicated.

The present planar membraneless microfluidic fuel cell design has several advantages over previous designs. In particular, it takes advantage of the laminar flow conditions that exist between two large parallel plates with a microscopic separation between them. As described hereinbelow in greater detail with respect to FIG. 1, the present invention uses a structure referred to as a "flow control structure," and is designed to establish a condition of laminar flow of two solution streams flowing on either side of the flow control structure prior to the two streams coming into contact. The flow control structure has been called a "tapered cantilever" in U.S. Ser. No. 60/579,075. In some embodiments, the taper at its thin edge is tapered down to as thin a structure as can be obtained by a chemical etching process, such as a few atomic diameters or virtually zero thickness, but just thick enough to maintain structural integrity. In other embodiments, the taper at its thin edge is as thick as 50 microns. In some embodiments, the flow control structure is tapered on only one side, or is tapered on both sides. In some embodiments in which tapers are present on both side, it is contemplated that the taper angles may or may not be equal or symmetric when measured with respect to about a boundary layer between the two fluids. The advantages that accrue when adopting the planar microfluidic configuration over other (e.g. microchannel) configurations include:

a) deposition of electrode materials becomes a manageable process based on sputtering and/or evaporation techniques, b) the large solution/electrode interfacial area available in this design can lead to higher power devices, c) the stacking of devices can lead to potentially high power systems taking up small volumes, and d) most processing and manufacturing routines are industrially-scalable and in the future could be carried out using polymer substrates.

FIG. 1 is a drawing 100 showing a schematic sectional side view of a planar microfluidic membraneless micro-fuel cell, which is not to scale. In the embodiment depicted in FIG. 1, a flow cell 110 comprises two inlets 112, 114, which provide entry for two fluids. As is explained hereinbelow, the two fluids can be a fuel and an oxidizer that react to produce electrical power if the cell is to be used as a fuel cell, the two fluids can comprise substances that react as a result of applied electrical signals (for example in an electrochemical cell), or the two fluids can be fluids that carry substances that react chemically in the absence of an applied electrical signal (and therefore do not require the presence of electrodes). If the flow cell is constructed from a material that is transparent in a region of the electromagnetic spectrum, reactions conducted therein can be driven by applied optical illumination (e.g., ultraviolet, visible, and/or infrared radiation) that falls in the region of transparency, or using more generally electromagnetic radiation of any wavelength at which the wall material is transparent. In addition, electromagnetic radiation generated within the flow cell can be utilized outside the flow cell if the wall material is transparent at the wavelength of such electromagnetic radiation. While the present discussion describes a system using two fluids, systems using a plurality of fluids that operate according to the principles of the invention are contemplated.

The channels prior to the laminar flow channel 113, 115 are referred to as the "diffuser/condenser structure".

The flow cell 110 has a channel width, which is not represented in FIG. 1, because the width is a direction normal to the plane of the section shown in FIG. 1. For flow cells constructed using silicon as a material of construction, the width in principle can be as wide as the starting material will permit. In FIG. 1, the silicon material 120 is a wafer having a thickness of 250 or 380 microns (μm). As will be described hereinbelow, in the embodiment described, the silicon wafer material 120 is subjected to various processing steps as shown in more detail in FIG. 2. Given the present technology in which silicon wafers of 12 inches diameter are an article of commerce, widths measured in inches should be possible. The flow cell has a channel length 116, which for various embodiments described herein is 5 cm long. However, there is in principle no reason why channel lengths longer or shorter than 5 cm cannot be provided, according to principles of the invention.

The flow cell has an internal structure 130 useful for controlling the flows of the two fluids, which structure 130 can be referred to as a "flow control structure." The flow control structure 130 has been called a "tapered cantilever" in U.S. Ser. No. 60/579,075. The flow control structure 130 can be understood to separate the two fluids as they enter the cell. The flow control structure 130 additionally exercises control over the flow regimes of the two fluids individually. As the fluids flow past the flow control structure 130, they individually flow in relationship such that the flows are substantially parallel and flow in a laminar regime, whether or not the fluids were individually flowing in a laminar regime prior to being controlled by the laminar flow structure 130. The two fluids flow past the edge of the flow control structure 130, after which the two fluids come into mutual contact such that a stable boundary exists between the two fluids, each of which is flowing in a laminar flow regime. In the embodiment depicted in FIG. 1, the two fluids flowing in mutual contact, each fluid having laminar flow, are indicated by the numerals 132 and 134, and the surface 136 of mutual contact between fluids 132 and 134 is a diffusive boundary where the two fluids are in mutual contact. In the embodiment shown in FIG. 1, the surface 136 of mutual contact between fluids 132 and 134 is a substantially planar surface.

For the purposes of this application, that portion of the flow cell comprising the flow channel in which the two fluids flow as laminar flows in mutual contact will be referred to as the "laminar flow channel." It is to be understood that the regions of the interior of the flow cell that comprise volumes where the two fluids have not yet come into mutual contact can be used, if properly designed, to convert a flow having a first cross section (for example the circular cross section of 1 mm$^2$ area of inputs 112 and 114 as shown in FIG. 1) into a laminar flow having a second cross section (such as the hundred of microns thick laminar flow having a width of multiple millimeters). For example, a flow having a rectangular cross section of 100 microns (0.1 mm) depth by 10 mm width would represent a flow having an area of 1 mm$^2$. In a situation where the area of an input (or an output) stream differs from an area of the flow of that stream in the laminar flow region, by conservation of mass requirements, the velocity of the flow in the input (or output) and in the laminar region will differ. The flow cell additionally has at least one exit aperture, not shown in FIG. 1, where the fluids can exit the flow cell.

The flow cell 110 has a lower support sheet 142 and an upper covering sheet 140, which in some embodiments are constructed from 1.5 cm thick plexiglass. The entire device is held together as a series of layers of material by any convenient method or means, such as by using nuts and bolts, by clamping, by crimping, by using glue such as epoxy, or by fusing the two outer structures together (for example by welding if the outer layers are made of plastic).

Since the flow cell 100 of FIG. 1 is intended to additionally show the electrodes required for operating the flow cell 110 as a fuel cell, there are shown layers 150, 152 representing metal conductors, which are typically some tens of microns thick, but can be any convenient thickness sufficient to carry the currents generated or applied to the cell without representing an appreciable resistive load. As is described in greater detail below, the electrodes can also be provided as metal layers applied to substrate materials for ease of fabrication and handling.

In FIG. 1, the electrodes 150 and 152 are oriented so that their large surface in contact with a respective fluid 132 and 134 is parallel to the "virtual interface" that is present at the surface 136 of mutual contact between fluids 132 and 134. In this embodiment, it is possible using electrodes that span the entire width of the flow channel, to have a substantially constant distance between a point on a surface of an electrode and a point of the surface 136 of mutual contact between the two fluids 132 and 134, for example by dropping a perpendicular from a point on the surface of he electrode to the surface 136. In other embodiments, it is possible to arrange one or both of the electrodes so that such a constant distance does not occur. An advantage of having the electrodes on opposite sides of the flow channel is that one can provide a laminar flow regime in which the width of each sheet of fluid is many times larger in dimension that the thickness of each sheet of fluid, where the thickness of a sheet of fluid is measured from the surface 136 to the electrode surface in contact with that fluid, and the width is measured by the width of the flow channel, which in the flow regimes described herein is also the width of the mutual contact surface 136. For example, in a laminar flow regime having fluid thicknesses of the order of 100 microns flowing in a 5 mm wide channel, the ratio of the width to the thickness will of the order of 5 mm=5000 microns divided by 100 microns, or a ratio of 50. The interface area between the two fluids per cubic millimeter of fluid will be 5 mm$^2$ per mm$^3$ (area=5 mm×1 mm=5 mm$^2$ and volume=5 mm width×0.2 mm depth×1 mm=1 mm$^3$) or 5 times that of the device shown in U.S. Patent Application Publication 2004/0072047. An advantage of having the electrodes on opposite sides of the flow channel is that one can avoid losses due to gaps required to prevent electrodes placed on the same side of a flow channel to remain separated (e.g., too avoid shorting the electrodes). An advantage of having electrodes that span the entire width and length of the surface of a flow channel is that in such a design there are no asperities introduced by the abrupt edge of a electrode that is only covering a partial portion of the flow channel surface, so that inadvertent convective or turbulent flow in the fluid is not inadvertently introduced.

In the structure described herein, laminar flow interfaces having significantly larger areas are produced by using the flow control structure. This design allows for the solutions to flow in laminar fashion prior to coming into contact over a large planar area of two microscopically separated plates, ensuring a uniform laminar flow throughout the laminar flow structure. The flow control structure also allows the laminar flow regime to be produced using relaxed design constraints as compared to the design of Markoski. In particular, a design using the flow control structure allows a laminar flow interface to be set up between two fluids that are injected on the same face of the structure (as shown and described in greater detail in connection with FIG. 1), allowing for much simpler connections of tubes or conduits feeding the fluids into the structure. In addition, because the laminar fluid flow regime of each fluid is individually set up prior to causing the two flows to come into contact, it is possible to create fluid flow regimes in which two individual wide sheets of fluid flowing under laminar flow conditions are first caused to arise, and then the two fluid sheets, each in planar laminar flow, are brought into mutual contact, creating an interface having laminar flow properties and dimensions as wide as the fluid sheets and as long as one may conveniently elect to design. In the examples described herein, interfaces having laminar flow over areas of 5 mm width by 5 centimeter length, or 2.5 cm$^2$ in area, have been produced. Dimensions of width and length ranging from 1 cm to 1000 cm are in principle possible.

According to the present invention, it is in principle possible to et up two or more sheets of fluid each flowing in a laminar flow regime where the thicknesses of individual sheets differ. By way of example, it may be useful to make the thickness of one sheet of fluid twice as thick as another sheet of fluid if they contain, respectively, reagents in a concentration ratio of one to two, which reagents react in a ratio of one to one, so that both sheets will be depleted of reagent at substantially the same distance along the laminar flow cell, rather than having one fluid exit carrying excess unreacted reagent.

The present invention, when applied to fuel cells, not only eliminates the need for a PEM, but also provides a versatile flow cell having many uses, including as a planar membraneless microfluidic fuel cell. The flow cell provides for the establishment of laminar flow of at least two solution streams (such as fuel and oxidant) separated by a "virtual membrane," which is a diffusive interface between the two solutions. In the embodiment of fuels cells as described herein, this interface allows for diffusive conductivity of protons, while minimizing the bulk mixing of the two solutions. Laminar flow has been used in numerous systems because of the advantages it affords, especially the minimal mixing of solutions flowing side by side. In several embodiments that are described in greater detail, the present invention applies this flow regime to a planar microfluidic membraneless fuel cell. The power-producing capabilities of several exemplary structures are presented.

Superior Uniformity of Planar Flow

In addition to the technological advantages mentioned above, the planar structure of PM$^2$FC offers an additional advantage over prior microchannel based fuel cells related to the superior uniformity of laminar flow between two parallel plates, as compared to that of flow within a microchannel. Even without a complex mathematical treatment, it is evident that fluids flow non-uniformly within narrow enclosures. When flowing through a narrow microchannel, the velocity profile of the fluid is highly non-uniform, since the boundary conditions require that the velocity of the fluid be zero at the walls of the microchannel. Accordingly, a large volume of the fluid is stagnant near the walls of the microchannel and this will likely result in low rates of reaction and low power density of the microchannel-based fuel cell.

An expression describing the fluid velocity distribution at point r within a cylindrical microchannel of radius R is given by:

$$V(r) = -\frac{1}{4\mu} \cdot \frac{dp}{dz} \cdot (R^2 - r^2) \tag{1}$$

For r=R (corresponding to the walls of the channel) the fluid velocity is zero, and for r=R/2, all other factors being invariant, the fluid velocity attains it highest value.

In the case of laminar flow between two large parallel plates which can be considered semi-infinite in width and/or length as compared to the spacing between the plates (FIG. 1A), the appropriate expression is:

$$V(y) = -\frac{1}{\mu} \cdot \frac{dp}{dx} \cdot \frac{y}{2} \cdot (h - y) \tag{2}$$

where h is the spacing between the plates and y is distance from the bottom plate. Equation (2) describes a much more uniform velocity distribution that does not vary along the direction parallel to the surface of the plates, but only in the y-direction. The uniform flow of the fluids between two parallel palates will be beneficial in preventing mixing of the two fluids, while maintaining high power density, due to the large reaction area.

Chemical Reagents and Instrumentation

Tests to establish that laminar flow occurs in the silicon microchannels used aqueous solutions of FeCl$_2$ (Sigma Aldrich, Milwaukee, Wis.) and bathophenanthroline sulphonate (GFS Chemicals, Powell, Ohio). Millipore water was used for all aqueous solutions (18 M.cm, Millipore Milli-Q). In one embodiment, the fuel chosen to test the behavior of the planar micro-fuel cell design was 0.5 M formic acid (Fisher Chemical, 88% Certified ACS, Fairlawn, N.J.) in 0.1 M H$_2$SO$_4$ (J. T. Baker-Ultrapure Reagent, Phillipsburg, N.J.). Fuel solutions were bubbled using N$_2$ (Airgas, Inc.) for 30 minutes prior to use in the fuel cell. The oxidant was typically 0.1 M H$_2$SO$_4$ aerated with O$_2$ gas (Airgas, Inc.) for 30 minutes prior to introduction into the fuel cell. Bismuth studies were carried out using 0.5 mM Bi$_2$O$_3$ (GFS Chemicals, Powell, Ohio) in 0.1 M H$_2$SO$_4$ following the documented procedure of Smith and Abruña (J. Phys. Chem. B, 102 (1998) 3506-3511).

All cyclic voltammetry experiments for characterization of the platinum thin film electrodes were carried out using a CV-27 potentiostat (Bioanalytical Systems, West Lafayette, Ind.). The reference electrode was Ag/AgCl (sat. NaCl) and the counter electrode was a large area Pt wire coil. All electrochemical measurements were carried out in aqueous 0.1 M H$_2$SO$_4$ (J. T. Baker-Ultrapure Reagent). Fuel and oxidant were pumped into the PM$^2$FC using a dual syringe pump (KD Scientific, Holliston, Mass.) with two syringes (Becton Dickinson lewar-lock 60 cc) affixed with polyethylene tubing (o.d. 2 mm) in order to integrate the pumping system to the PM$^2$FC. A HeathKit variable load resistor was used in conjunction with a digital multimeter (Keithley, Cleveland, Ohio) in order to carry out power measurements.

PM$^2$FC Materials Considerations

During the development of the PM$^2$FC design, numerous materials and processing considerations were addressed in order to facilitate the fabrication of a reliable and versatile fuel cell platform. This platform, in turn, served as a test-bed for further development of this design. These considerations involved a) the substrate used for the microchannel design, b) the nature of the electrocatalyst and its deposition method, c) the microstructure of the catalyst, as well as the nature of the substrate onto which the catalyst was deposited, d) methods of assembly of the electrodes and channel structure into a liquid-tight sealed assembly, and e) interfacing the microchannel device with macro-scale instrumentation and a fluid-delivery system.

Many of the above-enumerated considerations dealt directly with the parallel-plate electrodes that were employed in the microchannel fuel cell. This fuel cell platform was designed to be versatile and thus accommodate microchannels of varying thickness, length, width, and number in order to have deliberate control over the power output of the cell. The development of a flexible, stable, and reusable electrode using 300 FN Kapton® provided a reproducible electrode surface that was easily integrated into each of the microchannel designs employed.

In one embodiment, silicon is the substrate for microchannel development. The photolithographic steps used to process silicon are well established and are well-suited for the fabrication of devices. Silicon also provides a rigid substrate that is easy to work with, and that yields channels of reproducible quality. While the fuel cell described in the present embodiment can be run at room temperature, the silicon substrate will allow the cell to be operated at elevated temperatures, for example to enhance fuel oxidation with no change to the fuel cell platform itself, or generally to provide a cell that allows operation at temperatures other than room temperature. In the embodiments described, conventional photolithography is used for silicon processing. One can take advantage of the ease with which flow cell and microchannel parameters can be varied using photolithography. Optimization of microchannel dimensions can be carried out in relatively short time periods.

In the embodiment described, formic acid was used as a fuel. Platinum catalyzes the oxidation of formic acid. A reaction that occurs at one electrode in an electrically mediated reaction scheme is known the electrochemical arts as a half-cell reaction. The fuel cell reactions using formic acid and oxygen, and their half-cell potentials, are:

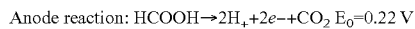

Anode reaction: HCOOH→2H$_+$+2e−+CO$_2$ E$_0$=0.22 V

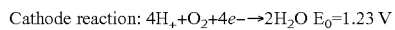

Cathode reaction: 4H$_+$+O$_2$+4e−→2H$_2$O E$_0$=1.23 V

While there are disadvantages when using formic acid, such as CO poisoning of the Pt catalyst, it was a convenient, as well as easily controlled, system with a large open circuit potential and high electrochemical efficiency. This fuel-oxidant combination is convenient to use to study parameter optimization of a fuel cell design.

Microchannel Fabrication

Microchannels were fabricating employing standard photolithography techniques at the Cornell Nanoscale Facility (CNF). Standard 4-inch double-sided polished <100> silicon wafers (250 μm or 380 μm thick) with 100 nm of Si$_3$N$_4$ grown on both sides were used. The process flow is described with respect to FIG. 2, which is discussed in more detail hereinbelow. L-Edit Pro (Tanner EDA Products) was used to design the CAD for the masks. An optical pattern generator (GCA PG3600F) was used to write the masks, which were 5 in$^2$ chrome-coated glass. The resist used for processing was Shipley 1813 photoresist (Shipley 1800 Series) spun at 3000 rpm for 60 sec. Wafers were then hard baked at 115° C. for 2 minutes on a vacuum hotplate. A contact aligner (EV 620, Electronic Visions Group) was used to transfer the pattern from the mask to the resist-coated silicon wafers. UV lamp exposure times varied between 6-20 sec. The wafers were then developed, using Shipley 300 MIF developer, for 60 s and the nitride layer was etched using CF$_4$ chemistry in a reactive ion etching ("RIE") system (Oxford Plasma Lab 80+ RIE System, Oxford Instruments). After repeating these steps for the backside of the wafer, the resist was stripped with acetone and the wafers were put into a 25% KOH solution held at 90° C. in order to etch the silicon at a rate of about 2 μm/min. The 380 μm wafers were etched for approximately 1 hr or until 80 μm of silicon on each side of the wafer were etched. For the 250 μm wafers, this etch time was reduced in order to etch approximately 60 μm on each side of the wafer. This etch defined the thickness of the flow control structure. Two subsequent patterning and nitride etch cycles were carried out in order to pattern the flow control structure. The wafers were then soaked in hot Nanostrip (Cyantek Corp., Fremont, Calif.) at 90° C. for 10 minutes, and a second 25% KOH etch was carried out at 90° C. The second KOH etch shaped a flow control structure of approximately 120-180 μm thick, which was thinned down to a thickness of the order of less than 100 μm. The tapered edge at the end formed due to the selectivity of the KOH etch to the <100> and <110> planes of the silicon, thus creating an angle of 54.7° relative to the surface normal. The sections of the channel, which were etched previously, continued to be etched until all of the silicon was removed and the flow control structure remained. The final microchannels were then coated with a 1 μm layer of Parylene-C (Labcoater) in order to electrically isolate the silicon channel from the electrodes and electrical contacts, as well as to facilitate a watertight seal in the final device.

Figure 2:
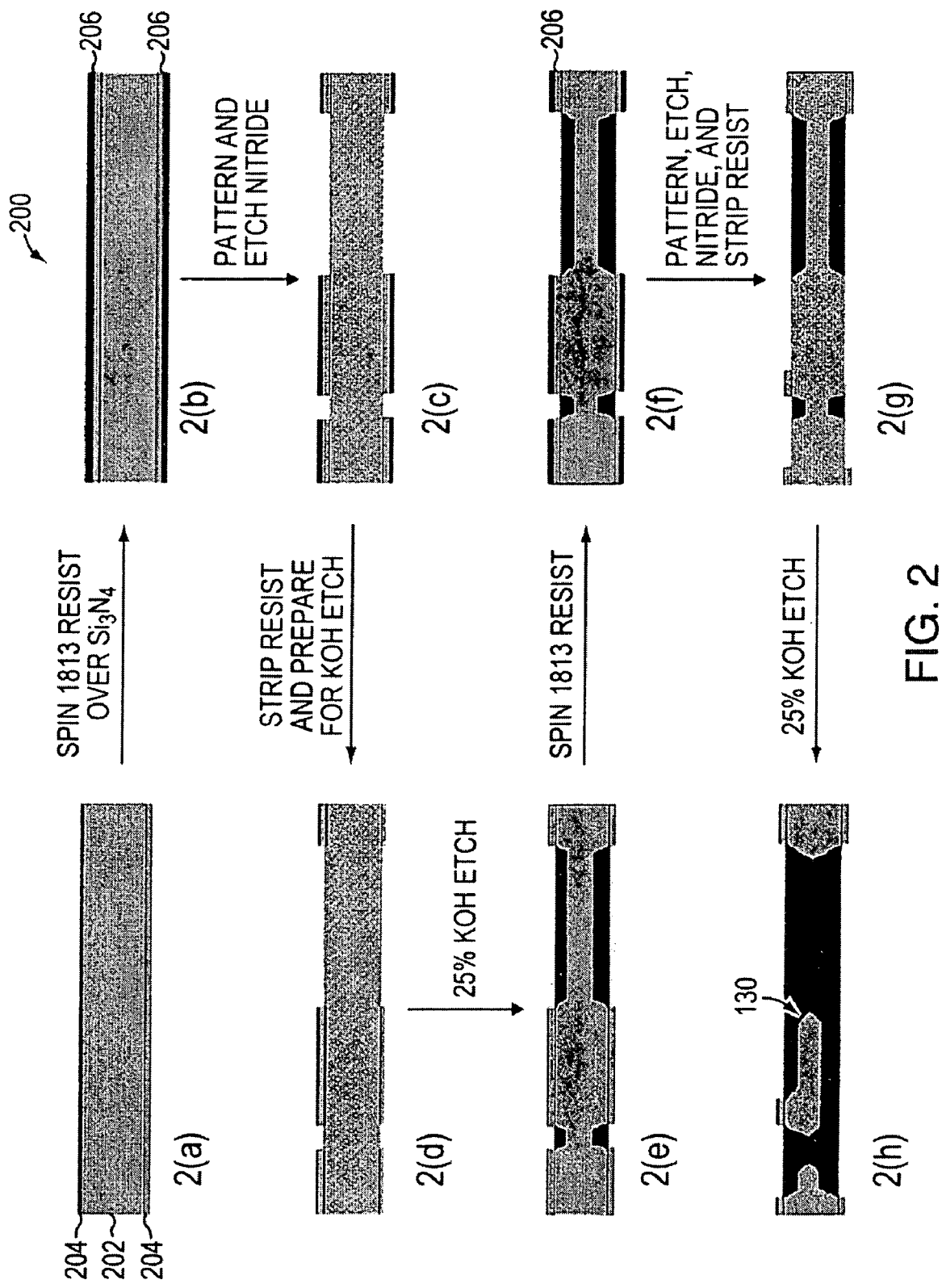
FIG. 2 is a diagram depicting the process flow for fabricating silicon microchannel flow cells from a silicon single crystal wafer that is shown in side section, according to principles of the invention.

FIG. 2 is a diagram 200 depicting the process flow for fabricating silicon microchannel flow cells from a silicon single crystal wafer 202 that is shown in side section. At FIG. 2(a), there is shown a silicon wafer 202 having a thin Si$_3$N$_4$ layer 204 on each surface. The silicon wafer is coated with photoresist 206 on each surface, as shown at FIG. 2(b). The photoresist 206 is patterned by being exposed, and the nitride is etched where openings in the photoresist are created, as shown at FIG. 2(c). The resist is then removed and the wafer is ready for etching in base, as shown at FIG. 2(d). After being etched in 25% KOH etch, the wafer has a cross section such as that depicted at FIG. 2(e), where the dark regions indicate where silicon material has been removed, leaving thinned regions of silicon. The gray regions represent undisturbed silicon single crystalline material. The etch is performed for a time sufficient to remove silicon to a predetermined extent, so that the application of a second etching step will remove material from both the undisturbed regions and the thinned regions etched in the first etch step at equivalent rates, so as to remove all of the silicon in the thinned regions, and so as to remove only some (e.g., an equal thickness) of the silicon present in the areas of original silicon wafer thickness. After the first etching step, additional resist 206 is applied to the etched wafer, as shown at FIG. 2(f). The new resist is again patterned, and used as a mask to etch the nitride in selected areas on the undisturbed regions of the silicon wafer, as shown at FIG. 2(g). In a final etch step, the silicon wafer is again etched so that in certain areas, all of the silicon is removed, leaving an open channel, and in other areas, silicon in the form of a flow control structure 130, which is supported at least one extremity (in FIG. 2, an extremity above or below the plane of the cross-sectional diagram) by unetched silicon material, so as to be maintained in a desired position and orientation within the etched region of the silicon wafer, at shown at FIG. 2(h). In one embodiment, in which the flow control structure 130 is attached to both sides of the flow channel, the width of the flow control structure 130 is equal to the width of the flow channel. Other processing sequences, using other materials of construction and/or other processing methods, can be envisioned to generate a channel within which is located a flow control structure.

Using the basic method outlined above, we fabricated a variety of sizes and configurations of laminar flow microchannels comprising flow control structures, including:

a) Single, 1 and 3 mm wide, 5 cm long, and 380 μm thick microchannels,
b) Single, 1 and 5 mm wide, 5 cm long, and 250 μm thick microchannels,
c) Five-microchannel arrays of 1 mm wide, 5 cm long, and 380 μm thick microchannels in parallel and fed fuel and oxidant simultaneously, and lastly,
d) Stackable single 1 mm wide, 5 cm long, and 380 μm thick microchannels.

Figure 3:
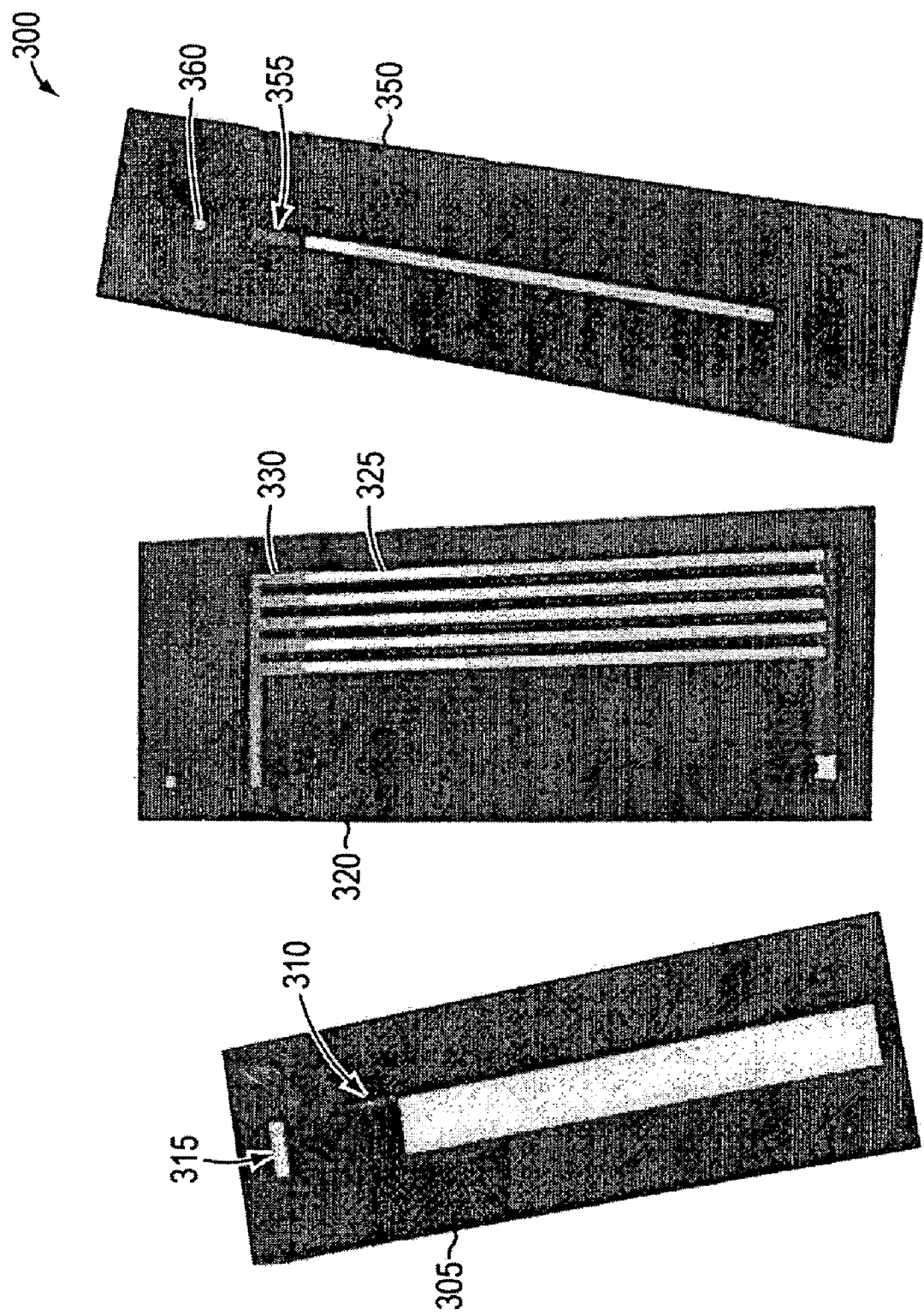
FIG. 3 is a diagram that illustrates various embodiments of laminar flow microchannels comprising flow control structures, according to principles of the invention.

FIG. 3 is a diagram 300 that illustrates various embodiments of laminar flow microchannels comprising flow control structures. On the left, there is shown a 5 mm wide, cm long silicon microchannel 305 having a flow control structure 310 and an aperture 315 at one end thereof. The silicon microchannel 305 was fabricated from a 250 μm thick silicon wafer. In the center, a 5-microchannel array 320 of 1 mm wide and 5 cm long microchannels 325 was fabricated in a 380 μm thick silicon wafer. Flow control structures 330 can be discerned at the ends of the channels nearest the top of the figure. On the right is shown a 1 mm wide, 5 cm long silicon microchannel 350 that was fabricated in a 380 μm thick silicon wafer. A flow control structure 355 can be discerned at the end of the microchannel nearest the top of the figure, and an aperture 360 is also visible.

Electrode Fabrication

Platinum (Pt) was chosen as an electrode material for the initial planar flow cell design, as well as for parameter optimization, since its behavior is well established. It is understood that the use of Pt may not be ideal or optimal. In subsequent embodiments, alloys or intermetallic compounds of Pt have been shown to work well, including PtPb and PtBi. Electron-beam evaporation techniques were employed for the deposition of platinum thin films with various adhesion layers (CVC SC4500 Combination Thermal/E-gun Evaporation System). In some embodiments, substrate materials used included glass, Kapton® (Dupont, Wilmington, Del.) with and without a Teflon overcoating, polypropylene and Tefzel® (a tetrafluoroethylene/ethylene copolymer, DuPont). In these studies, the adhesion and stability of the deposited film, as well as its electrochemical behavior, were investigated in detail using cyclic voltammetry. In this context, the use of platinum was most convenient since the voltammetric response of polycrystalline platinum is very well established and allows for the determination of the microscopic area of the deposit via the coulometric charge associated with hydrogen adsorption.

Cyclic voltammetry was carried out in 0.1M $H_2SO_4$ for platinum film electrodes with varying thickness (between 10-100 nm) deposited onto Kapton®, glass, and Tefzel®. Metal adhesion layers comprising either Ti or Ta (between 10-50 nm thick) were employed.

Figure 4:
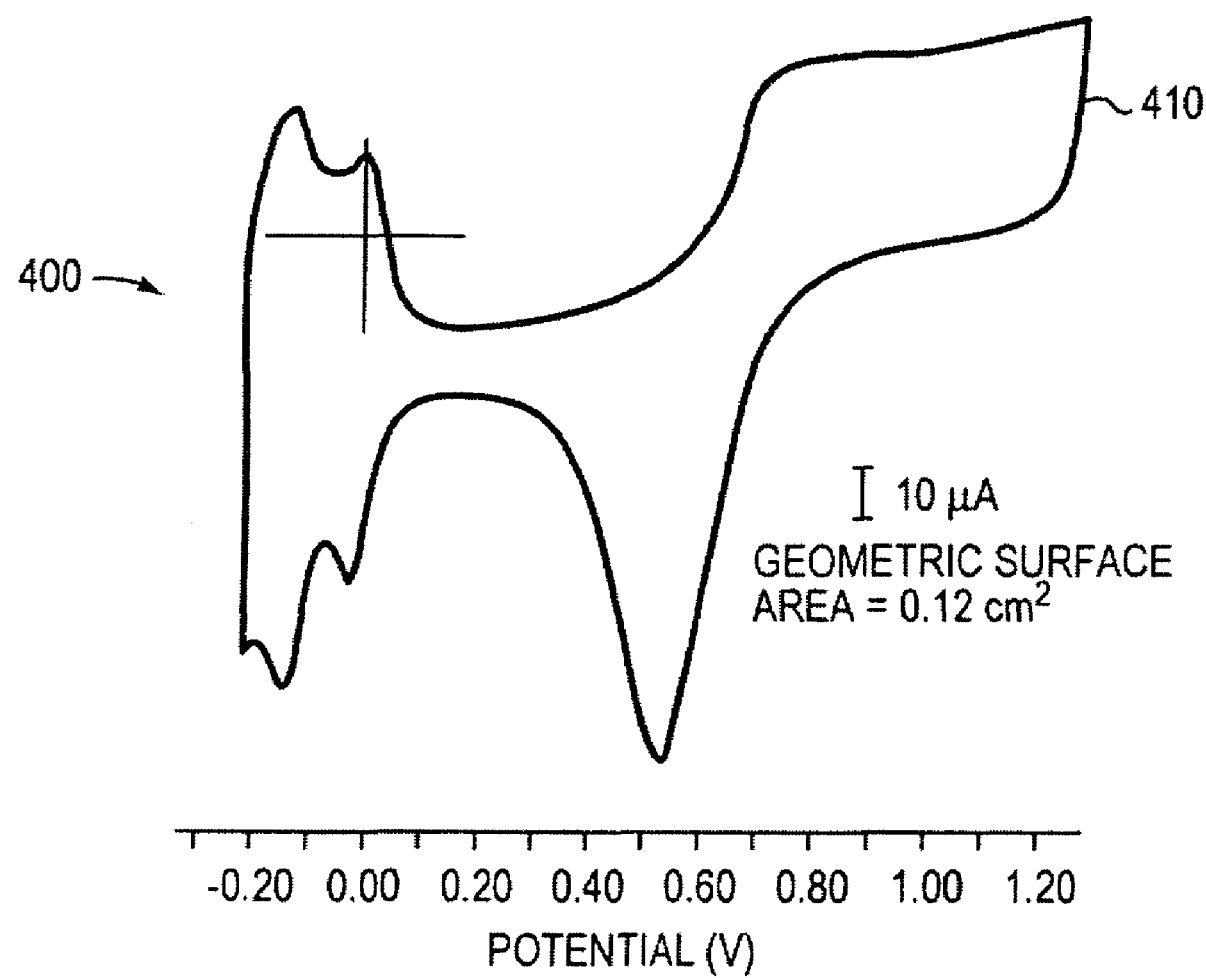
FIG. 4 is a diagram that shows a typical cyclic voltammogram of polycrystalline Pt on a Kapton® substrate, according to principles of the invention.

FIG. 4 is a diagram 400 that shows a typical cyclic voltammogram 410 of polycrystalline Pt on a Kapton® substrate. The point indicated at the intersection of the crossed straight lines in the diagram represents an origin of voltage in the horizontal direction, and an origin of current in the vertical direction. A voltage scale is given at the bottom of the diagram and a current scale indicating 10 microAmperes (μA) is shown to the right of the cyclic voltammogram 410. The electrode material studied in this test was Kapton® with 10 nm of Ta (as an adhesion layer) and 100 nm of Pt evaporated on to the surface. The electrode was immersed in 0.1 M $H_2SO_4$. Ag/AgCl was used as a reference electrode and a large area Pt wire coil was used as the counter electrode. The voltages scan rate used was 0.100 V/s.

The electrochemical response obtained from the films was that typical of a polycrystalline platinum electrode, and from the hydrogen adsorption charge, roughness factors of approximately 30-50%, depending on the substrate, were determined. That is, the microscopic area was 30-50% larger than the geometric area. These voltammetric experiments indicated that a preferred substrate for the electrodes was the flexible Teflon coated 300 FN Kapton®. Good electrode stability and good adhesion of the platinum to this substrate in 0.1 M $H_2SO_4$, a common electrolyte in fuel cell systems, was observed. Kapton® has a variety of attractive characteristics, including its flexibility, chemical inertness, ability to bond to substrates (such as glass and silicon) at reasonable temperatures (approximately 300° C.), as well as the capacity for surface roughening using diamond paste or sandpaper. The platinum film deposited on Kapton® could also be electrochemically roughened, in order to increase the Pt surface area, following the procedure carried described by G. M. Bommarito, D. Acevedo, and H. D. Abruna (*J. Phys. Chem.*, 96 (1992) 3416-3419).

Another advantage of using a flexible polyamide, such as FN Kapton®, as the electrode substrate is the convenience of being able to evaporate platinum onto large sheets and subsequently cutting the electrodes from them. The ability to fabricate multiple electrodes, which are reusable, in a single batch enables rapid characterization of the electrodes and allowed the main focus of optimization and characterization to be on the microchannel design parameters and electrode surface modification for the final working PM²FC device, without having to worry about tedious processing of the electrodes themselves. Bulk sheets composed of thin films with the following evaporation ratios were fabricated: 20 nm of Ta and 30 nm of Pt, 50 nm of Ta and 50 nm of Pt, as well as 200 nm of Cr, 40 nm of Ta to cap the Cr layer, and 100 nm of Pt, all on 300 FN Kapton®. These electrodes proved to be the most robust under the acidic conditions of the micro-fuel cell, as well as reusable.

Determination of Establishment of Laminar Flow

In order to confirm the establishment of laminar flow, aqueous solutions of 1.5 mM $FeCl_2$ and 3.0 mM bathophenanthroline sulphonate (BPS) respectively, were injected into the microchannel by means of a dual syringe pump. Individually, both of these solutions are colorless. However, $Fe^{2+}$ has a very high affinity, and rapid kinetics, for the formation of the tris-chelate of BPS; $[Fe(BPS)_3]^{4-}$ which is intensely colored (cherry-red).

Figure 5:
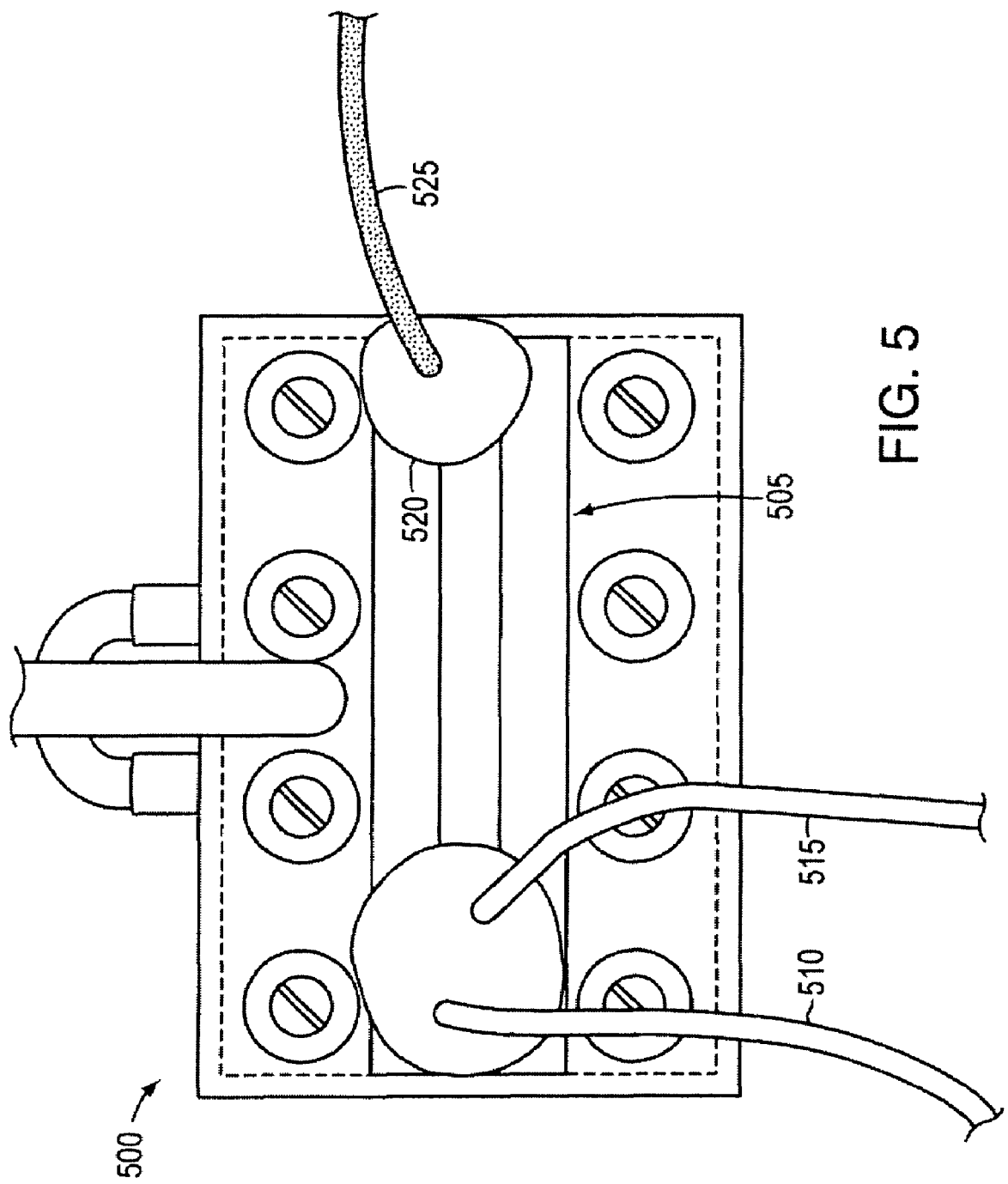
FIG. 5 is a picture that shows a planar silicon microchannel into which millimolar solutions of $Fe^{2+}$ and BPS are being fed, according to principles of the invention.

FIG. 5 is a picture 500 that shows a planar silicon microchannel 505 into which millimolar solutions of $Fe^{2+}$ and BPS are being fed. The silicon microchannel 505 is 5 mm wide, 5 cm long, and 380 µm thick. Two input tubes 510, 515 provide colorless fluids that enter the silicon microchanel 505 from the same face, namely the top surface in the embodiment shown in FIG. 5. In the embodiment of FIG. 5, the two input tubes 510, 515 were attached to the flow cell shown with epoxy. However, any convenient method of connecting the input or supply tubes 510, 515 to the flow cell can be used, such as silicone cement, threaded connectors, quick connects, or "o" ring seals. The silicon microchannel is shown sandwiched between two transparent plexiglass plates which are held together by eight bolts, and supported by a laboratory clamp. At the exit aperture 520, there is attached an exit tube 525 that carries away the fluids that exit the flow cell. In the example shown in FIG. 5, it is apparent that the exiting fluid in the exit tube 525 is dark (in reality it is red), while the input fluids, and the fluid flowing from the inputs to the exit aperture is also seen to be clear. From what is observed in FIG. 5, it is apparent that the two fluids that enter the flow cell from tubes 510 and 515 do not mix sufficiently to cause reaction, and color, during the time the fluids flow through the flow cell, but only mix upon exiting the flow cell, where the laminar flows of the two fluids are finally disrupted, thereby causing bulk mixing, and the associated chemical reaction occurs. The waste solution tube shows the intense coloration of the chelate formed when the two solutions mix as they are transported out of the flow system. This conclusively demonstrates that the solutions have not mixed in the time scale involved in traversing the 5 cm long channel, or about 1.14 seconds (i.e., for a pumping speed of 0.5 ml/min, the solution travels at a rate of 4.4 cm/s in a 380 µm thick channel). There are no electrodes present in the embodiment shown in FIG. 5, because no reaction that generates electrical power, nor any reaction that requires an electrical signal for its operation, is being carried out.

Example of a Fuel-cell Assembly

After establishing that the proposed planar design generates laminar flow inside the microchannels, fabricated microchannels and electrodes were integrated into a fuel cell embodiment that illustrates various principles of the invention, including affording deliberate control over system parameters. The silicon microchannels were aligned in a Plexiglas cell with Kapton®-based platinum electrodes placed on the top and bottom of the microchannel, and were clamped together using bolts, as shown in FIG. 6.

Figure 6:
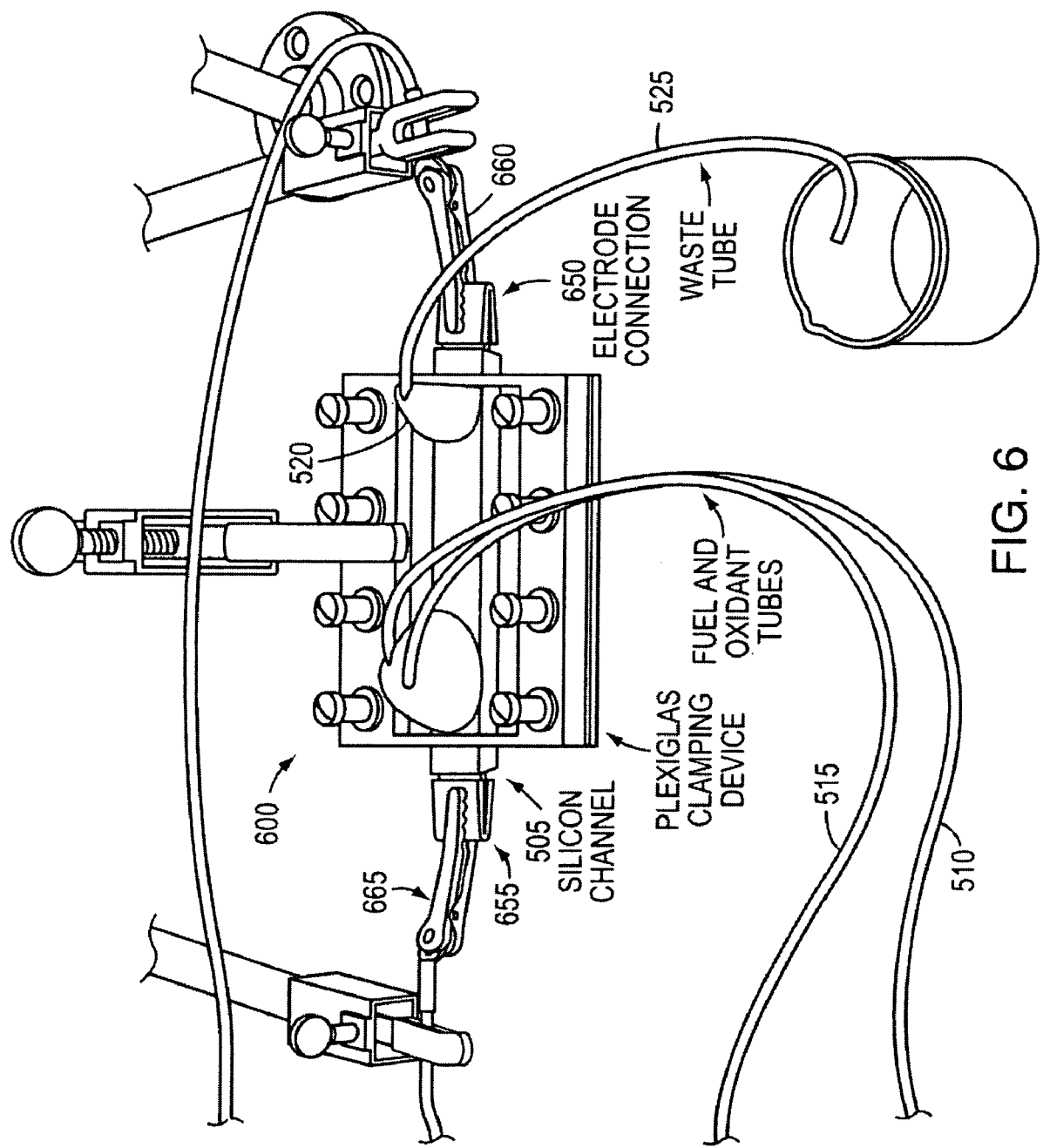
FIG. 6 is a picture that shows an example of a silicon microchannel flow cell configured as a micro-fuel cell, according to principles of the invention.

FIG. 6 is a picture that shows an example of a silicon microchannel flow cell configured as a micro-fuel cell 600. In this fuel cell 600, a silicon microchannel 505 is provided. Two input tubes 510, 515 provide fluids that enter the silicon microchanel 505 from the same face, namely the top surface in the embodiment shown in FIG. 6. In the embodiment of FIG. 6, the two input tubes 510, 515 were attached to the flow cell shown with epoxy. However, any convenient method of connecting the input or supply tubes 510, 515 to the flow cell can be used, such as silicone cement, threaded connectors, quick connects, or "o" ring seals. The silicon microchannel is shown sandwiched between two transparent plexiglass plates which are held together by bolts, and the entire assembly is supported by a laboratory clamp. At the exit aperture 520, there is attached an exit tube 525 that carries away the fluids that exit the fuel cell. In the fuel cell embodiment, there are provided two electrodes 650, 655, which are connected to an external circuit by alligator clips 660, 665 and wires that lead to the external circuit, which is not shown, but can be a sink for power, such as a resistive or other load. In the fuel cell embodiment, the input fluids comprise a fuel and an oxidant, as discussed herein.

The channel and electrodes were then pressed between two Plexiglas plates with eight bolts to apply even pressure along the periphery of the channel, thus creating a watertight cell. The top Plexiglas plate had through holes drilled where fluid interconnects were affixed with epoxy. Corresponding holes were cut into the top electrode allowing fluid to pass into the channel and between the anode and cathode. Electrical contact to the electrodes was achieved by allowing their ends to protrude from the device and a copper foil was employed to decrease the contact resistance. The device was connected in series to a variable load resistor and a digital multimeter was used to measure the voltage across the cell when a load was applied. This assembly method allowed facile disassembly of the device. Rapid and convenient interchange of electrodes allowed characterization of various Kapton®-based electrodes, the ability to study surface-modified electrode substrates, as well as the ability to replace an electrode when damaged. The assembly also allowed ready interchange of silicon microchannels. The fabricated microchannels of different dimensions described previously were used to study the ability to modulate power generation, test the reproducibility of the fabrication processes, and determine the ease with which the platform could be reconfigured in order to control the power generated from the fuel cell.

In an embodiment having a flow cell lacking electrodes, there can be a chemical reaction at the interface (or very close to it) if there is laminar flow, which is expected to occur because chemical species diffuse across the boundary between two fluids flowing in a laminar flow regime in mutual contact. In an embodiment in which electrodes are optionally provided, there can be electrically-mediated chemical half cell reactions at the locations where electrodes are in electrical communication with respective fluid flows. When one or more half-reactions in electrically-mediated reactions occur, concentration gradients build up at the electrodes and that leads to diffusive behavior (according to Fick's Law). In principle, it is possible for both electrically mediated half-cell reactions and chemical reactions between diffusing species at the boundary between two fluids flowing in a laminar flow regime in mutual contact that do not require electrical signals external to the flow cell (or "non-electrically mediated reactions") to occur in the same cell at the same time. For example, one could generate a particular reactive species electrically within the cell, and then have that species react in a diffusional regime at the interface.

Formic Acid as a Test System for the Planar Micro-fuel Cell

Using the platform described in detail above, formic acid and $O_2$ saturated 0.1 M $H_2SO_4$ were used as fuel and oxidant, respectively, in order to observe the performance of the micro-fuel cell. In various embodiments, data were obtained using 300 FN Kapton® electrodes with deposition ratios as described hereinbelow with regard to FIGS. 7-10. The same clamping device was used for all microchannel sizes, excluding the 5-microchannel array, which used a slightly larger clamp in order to accommodate its larger width.

The fuel and oxidant were fed into the microchannel at flow rates of 0.5 m/min in the case of 1 mm wide microchannels, 2 ml/min for 3 mm wide channels, 2.5 ml/min for 5 mm wide channels and 5-microchannel arrays, and 1 ml/min for the stack of two 1 mm wide channels. These flow rates were determined by performing test runs using the device and using the criteria of maximum power production with no leakage of the cell, as well as no introduction of turbulent flow to the system.

The fuel used was 0.5 M formic acid in 0.1 M $H_2SO_4$ degassed with $N_2$ for 30 minutes and the oxidizer was an $O_2$ saturated solution of 0.1 M $H_2SO_4$. The fuel was degassed with $N_2$ in order to eliminate any $O_2$ that might be present at the anode and subsequently reduced, which would act as an internal "short circuit" for the device. Initially, however, the oxidizer was air saturated 0.1 M $H_2SO_4$ with no deliberately added $O_2$. This generated power densities on the order of only 30 $\mu W/cm^2$. Thus, it was determined that enhancement of the power output of the system could be achieved by simply increasing the $O_2$ concentration of the oxidant. The oxidant solution was aerated with $O_2$ gas for 30 minutes prior to introduction into the micro-fuel cell. All subsequent experiments were carried out with aerated oxidant solutions.

Power Characteristics for Single 1 mm Wide Microchannels

Figure 7:
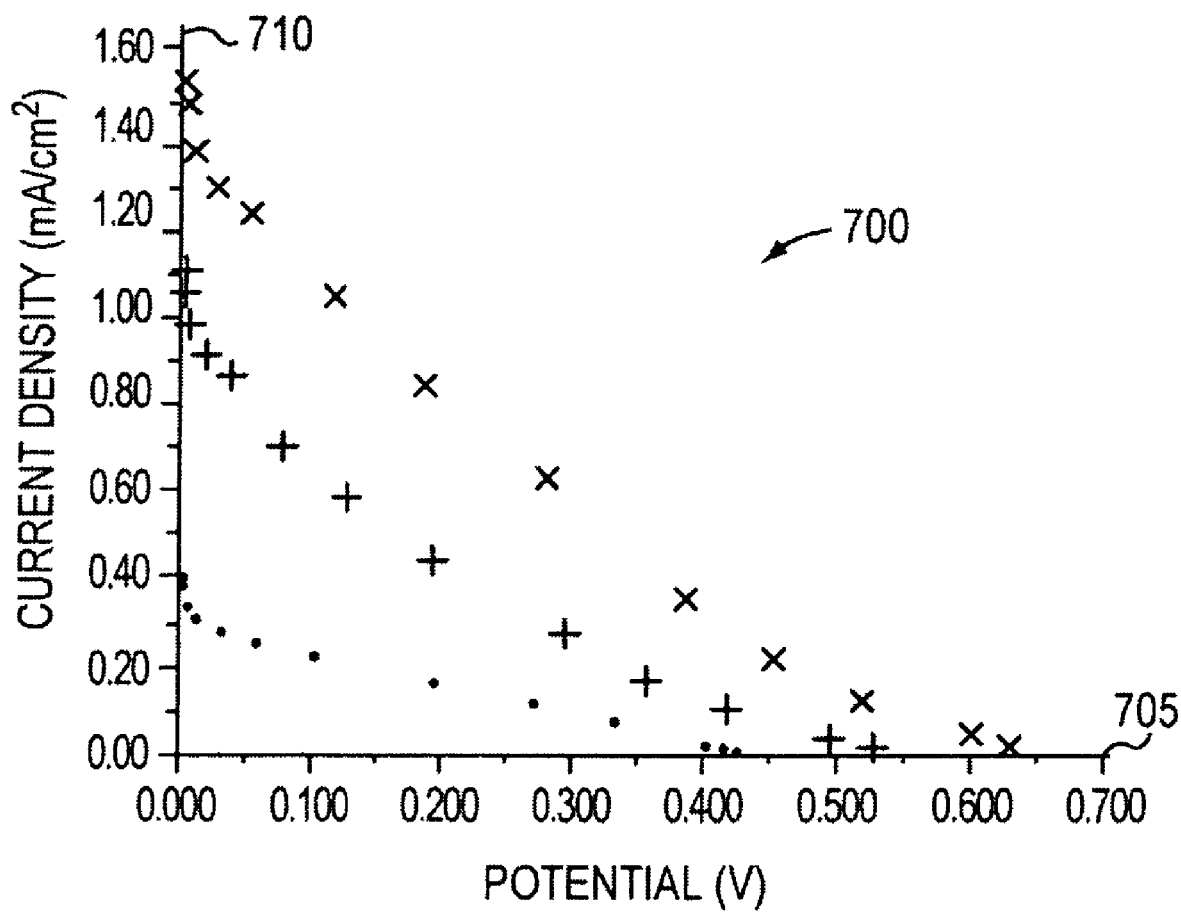
FIG. 7 is a diagram that shows i-V curves for a 1 mm wide, 380 mm thick Si microchannel fuel cell using fuel and oxidizer under various conditions, according to principles of the invention.

FIG. 7 is a diagram 700 that shows the i-V curves for a 1 mm wide, 380 mm thick Si microchannel fuel cell using fuel and oxidizer under various conditions. The horizontal axis 705 is potential in volts, and the vertical axis 710 is current density in $mA/cm^2$. In one embodiment, for which the data are depicted by solid circles, the fuel was 0.5 M formic acid in 0.1 M $H_2SO_4$ that were not bubbled with $N_2$, and the oxidant was air saturated 0.1 M $H_2SO_4$. The electrodes were Kapton electrodes with 50 nm of Ta and 50 nm of Pt. In a second embodiment, for which the data are depicted by "+" symbols, the fuel was 0.5 M formic acid in 0.1 M $H_2SO_4$ that was bubbled with $N_2$, and the oxidant was 0.1 M $H_2SO_4$ with deliberate addition of $O_2$. The electrodes were Kapton® electrodes with 50 nm of Ta and 50 nm of Pt. In a third embodiment, for which the data are depicted by "x" symbols, the fuel was 0.5 M formic acid in 0.1 M $H_2SO_4$ that was bubbled with $N_2$, and the oxidant was 0.1 M $H_2SO_4$ with deliberate addition of $O_2$. The electrodes were Kapton® electrodes with 50 nm of Ta and 50 nm of Pt, with the anode comprising Bi-modified Pt anode from immersion in an aqueous solution of 0.5 mM $Bi_2O_3$ in 0.1 M $H_2SO_4$ for 2 minutes. In each embodiment, the flow rate was 0.5 mL/min.

From the shape of the i-V curve, as well as the fact that power density was independent of flow rate, it was determined that the formic acid system is kinetically, and not mass transport, limited. Also, one can qualitatively ascertain the improvements made when using $O_2$ and $N_2$ sparged oxidant and fuel, respectively. The improvements are clearly evident in an increase in the open circuit potential of over 100 mV and a current density that more than doubles at zero applied load.

Figure 8:
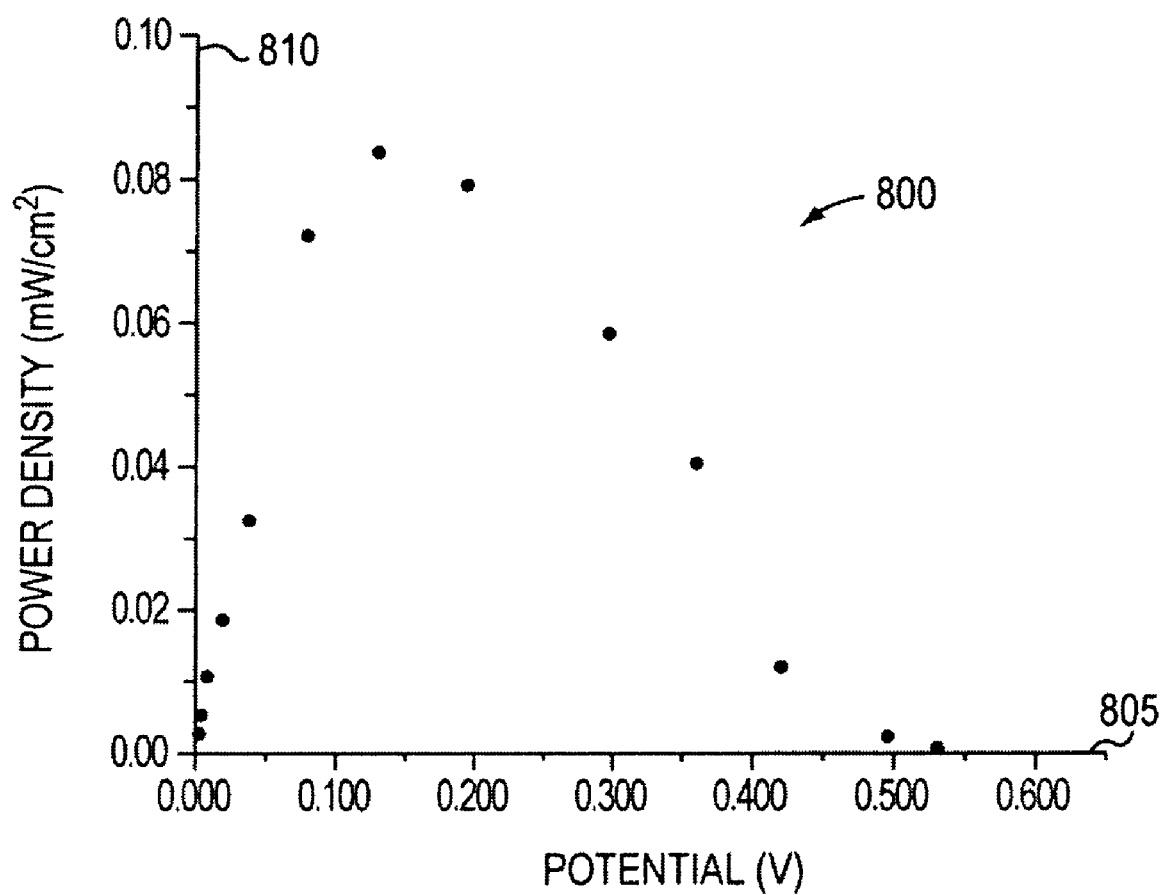
FIG. 8 is a diagram that shows power results obtained with a single 1 mm wide, 380 μm thick Si microchannel fuel cell, according to principles of the invention.

FIG. 8 is a diagram 800 that shows power results obtained with a single 1 mm wide, 380 μm thick Si microchannel fuel cell. Kapton® electrodes with 50 nm of Ta and 100 nm of Pt were used. The fuel component was 0.5 M formic acid in 0.1 M $H_2SO_4$ bubbled with $N_2$, and the oxidizer was 0.1 M $H_2SO_4$ aerated with $O_2$, with a flow rate of 0.5 mL/min. The horizontal axis 805 is potential in volts, and the vertical axis 810 is power density in $mW/cm^2$.

The cell used in the operation depicted in FIG. 8 has a 1 mm wide channel that is 5 cm in length, thus giving a geometric area of 0.5 $cm^2$. Current and power densities were determined using the geometric area of the electrodes. The power densities, current densities at zero load, and open circuit potentials obtained for a number of channels are summarized in Table 1. The power generated from a single microchannel device was 86 μW/cm and the open circuit potential was 0.428 V. The large overpotential required for $O_2$ reduction, as well as the slow oxidation kinetics for formic acid oxidation, account, at least in part, for the open circuit potentials observed. Results similar to those in FIG. 8 were obtained for microchannels 250 μm thick, 1 mm wide, and 5 cm long. In the embodiments studied, the thickness of the microchannel, in the case of the formic acid system, does not have an effect on the current and power densities. Other fuel systems may show different results. In the formic acid case, if power generation is invariant with channel depth (down to a depth where the fuel or the oxidant is depleted before the two fluids fully traverse the cell length), then thinner channels will mean a more compact micro-fuel cell when stacking the individual channels, as well as a decrease in the amount of fuel passed through the cell per unit time, without loss of power.

Anode Surface Modification

It is well known that modification of electrode surfaces can dramatically enhance electrocatalytic activity. For example, it has been previously established that the electrocatalytic activity of platinum surfaces towards formic acid oxidation can be greatly enhanced by the adsorption of Bi, As, and Sb. For example, Bi adsorbed on Pt catalyzes the

TABLE 1

| Channel Width * | Current at zero load (mA or mA $cm^{-2}$) | Open Circuit Potential (V) | Power (μW or μW $cm^{-2}$) |
|---|---|---|---|
| 1 mm wide ** | 0.458 mA $cm^{-2}$ | 0.428 | 32 μW $cm^{-2}$ |
| 1 mm wide | 1.09 mA $cm^{-2}$ | 0.532 | 86 μW $cm^{-2}$ |
| 1 mm - 250 μm thick | 0.88 mA $cm^{-2}$ | 0.473 | 85 μW $cm^{-2}$ |
| 1 mm - Anode modified with Bi adatoms | 1.51 mA $cm^{-2}$ | 0.636 | 180 μW $cm^{-2}$ |
| Stack of two 1 mm channels | 1.16 mA | 0.589 | 118 μW |
| 3 mm | 1.4 mA | 0.591 | 160 μW |
| 5 mm - 250 μm thick | 3.2 mA | 0.573 | 325 μW |
| 5-Microchannel array | 2.06 mA | 0.641 | 350 μW |
| 5-Microchannel array - Anode modified with Bi adatoms | 2.6 mA | 0.728 | 400 μW |

\* All thicknesses 380 μm and lengths 5 cm unless otherwise noted.
\*\* Oxidant not deliberately saturated with $O_2$.

oxidation of formic acid, as well as ethanol, and decreases CO poisoning of the Pt anode surface. Adatoms of Bi have been found to block sites that are commonly poisoned by CO, to enhance the complete oxidation of small molecule fuels due to electronic effects at the Pt surface, as well as have an affinity for oxygen. This oxygen affinity may become more relevant with regard to other potential small molecule organic fuels, such as methanol and ethanol, which require oxygen to generate $CO_2$. Surface modification of the anode electrode was carried out using adsorbed Bi adatoms according to the procedure of Smith and Abruña (J. Phys. Chem. B, 102 (1998) 3506-3511). Briefly, adsorption of Bi was carried out by immersing the Pt surface, in our case the Pt anode of our micro-fuel cell, into a 0.5 mM $Bi_2O_3$ in 0.1 M $H_2SO_4$ solution for 2-4 minutes and then rinsing with water. The blue circles (=solid circles with "x" symbols) in FIG. 7 show results obtained for a micro-fuel cell with Bi adsorbed onto the electrode surface and pure $O_2$ dissolved in the oxidizer solution. By adsorbing Bi adatoms onto the surface of the Pt anode, we were able to increase the initial current densities, the open circuit potential, and the power density when employing a single 380 μm thick microchannel with formic acid as the fuel. The initial current densities were increased to over 1.5 $mA/cm^2$ and did not drop off dramatically with time due to surface poisoning as was commonly encountered when using bare platinum surfaces. In addition a dramatic increase of 200 mV in the open circuit potential was observed. Power densities obtained were enhanced by nearly 50% when compared to results using unmodified platinum surfaces.

Multiple Channel Arrays

In order to increase the power obtained from a single device, a device having an array of microchannels was fabricated. Five microchannels, each 380 μm thick, 1 mm wide, and approximately 5 cm long were arranged in parallel and fed simultaneously from the same inlet holes. The waste fuel was removed from the channels by two outlet holes at the end of the channels. A new Plexiglas clamp was made to accommodate the microchannel array and larger electrodes were used in the device. One would anticipate that there should be five times the power output from this new array when compared to a 1 mm wide single microchannel, because the power should scale linearly with area.

Figure 9:
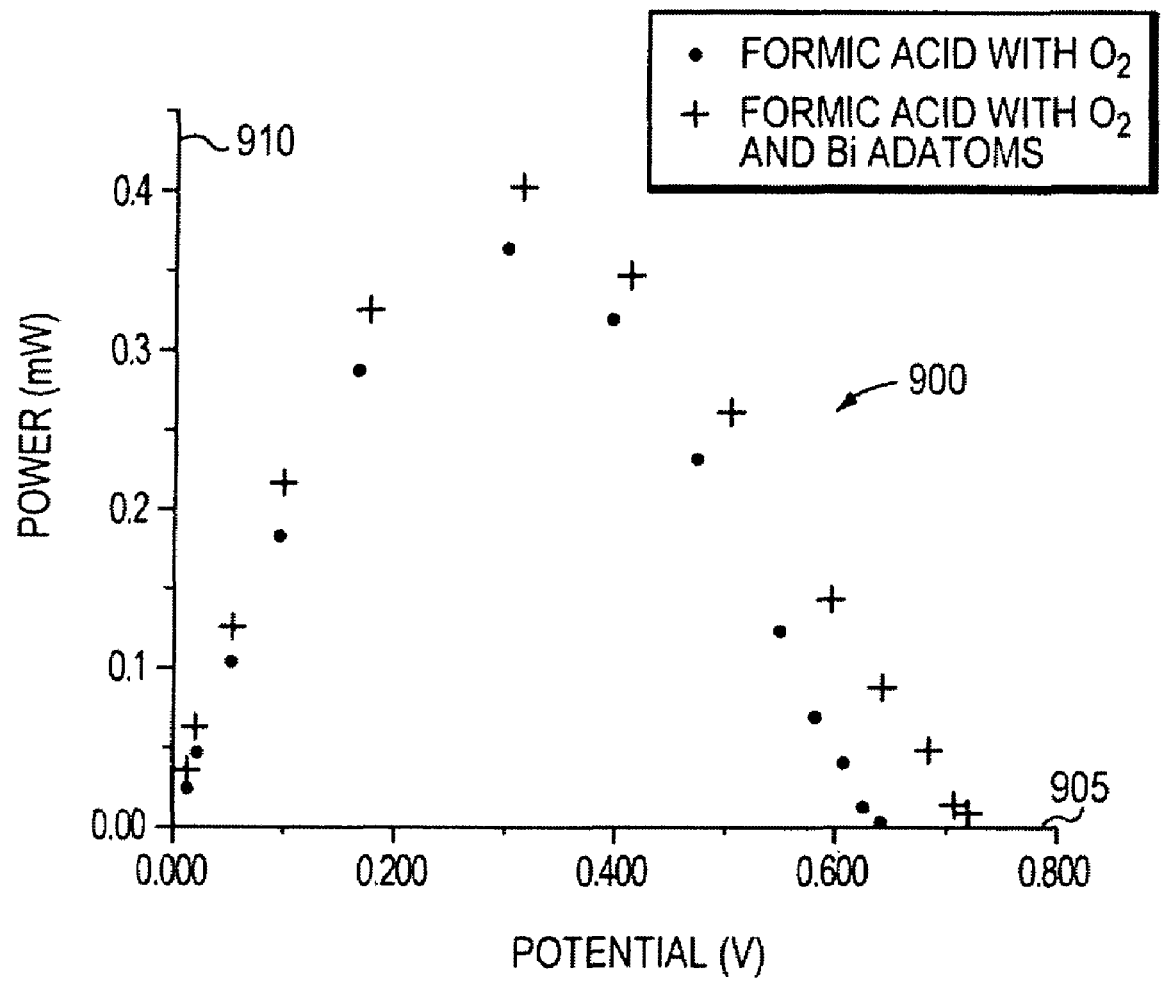
FIG. 9 is a diagram that shows the results obtained with a 5-microchannel array with formic acid as the fuel, according to principles of the invention.

FIG. 9 is a diagram 900 that shows the results obtained with a 5-microchannel array with formic acid as the fuel. Each cell is 1 mm wide. Kapton® electrodes with 50 nm of Ta and 50 nm of Pt were used. The fuel component was 0.5 M formic acid in 0.1 M $H_2SO_4$ bubbled with $N_2$, and the oxidizer was 0.1 M $H_2SO_4$ aerated with $O_2$, at a flow rate of 2.5 ml/min. The horizontal axis 905 is potential in volts, and the vertical axis 910 is power density in $mW/cm^2$. The data for these conditions are depicted with solid circles. The power obtained was 350 μW for a single device. The power generated by this device was larger than anticipated, which can be explained by the electrode surface roughness variations between different electrode evaporations, as well as refinements made throughout the device optimization process.

FIG. 9 also shows results for a 5-microchannel array with the anode modified with Bi adatoms, which data is depicted with "+" symbols. The power generated was 400 μW and the open circuit potential was over 700 mV. These results do scale linearly with those obtained for a single 1 mm wide microchannel surface-modified with Bi. The results obtained for the multiple channel arrays indicate that the arrays were filling completely and uniformly with no gas bubbles preventing laminar flow. In some embodiments, air bubbles trapped in one or more of the microchannels can disrupt the flow of the fuel and oxidant streams, causing a dramatic decrease in the power production of these devices and, as a result, the power output would not scale linearly when compared to single channel devices. Also, the power obtained from the device can be easily controlled due to the linearity with which power generation scales. The versatile planar design facilitates easy interchange of the Si microchannel, allowing one to fabricate channels with dimensions specific to the desired power.

3 mm and 5 mm Wide Microchannels

While the multiple channel arrays previously described have five times the effective surface area of a single channel, they take up more physical space, require a larger electrode (thus using more electrode material than a single channel) and require a larger clamp to accommodate the increased width of the Si array. The arrays also require greater pumping speeds in order to alleviate the problem of air bubbles disrupting the laminar flow of the arrayed system and to allow total filling of all the channels. In another embodiment, microchannels which were 3 mm in width were fabricated. These do not require a larger clamp as compared to a 1 mm wide channel, nor do they require more electrode material. In addition, such wider microchannels do not appear to require a much faster pumping speed than for the single 1 mm wide microchannels. The effective surface area available to generate power was about 1.2 $cm^2$ (that is, smaller than three times that of a single 1 mm wide microchannel) due to the fact that the flow control structure was fabricated to be slightly longer than the previous 1 mm wide channels. In the embodiment examined, the performance of the 3 mm wide channel should be approximately twice that of a single channel in terms of power generation. A 3 mm wide, 380 μm thick, Si microchannel was operated with a pumping speed of 2 ml/min. Table 1 shows the results for this channel. The power obtained was 160 μW, which demonstrates that indeed, the 3 mm wide channel gave results that were approximately twice the maximum power obtained from single 1 mm wide channels.

For efficient power generation, it is advantageous to maximize power output in a minimum amount of space. Microchannels which were 5 mm wide, 250 μm thick, and 5 cm in length were also fabricated in order to observe the same advantages as mentioned above for the 3 mm wide channel. The 5 mm wide microchannel was expected to produce power comparable to that produced from the 5-microchannel array. However, the Kapton® electrodes prepared for 5 mm wide channels introduced a problem. While the Kapton® electrodes could be cut to any size, they had a tendency to drape across, and into, the 5 mm wide channel, thus interrupting laminar flow. In order to circumvent this problem, Si was used as a substrate for the platinum electrodes. The Si was etched to produce fluid inlet and outlet holes in order for the fuel and oxidant to be injected into the Si microchannel and between the two electrodes. A thin film composed of 50 nm of Ta and 50 nm of Pt was evaporated onto the Si surface to serve as the electrode. These electrodes were then clamped on either side of the 5 mm wide channel using the same clamping device employed previously. Table 1 also shows the results for this device and, as for the 3 mm wide microchannel case, the power output for the 5 mm wide channels scaled linearly with the single 1 mm wide channels. It also performed just as well as the 5-microchannel arrays, producing 325 μW from a single device.

Stacked Cells

As indicated above, one of the goals of constructing a $PM^2FC$ was to generate the maximum amount of power in a minimum amount of space. In some embodiments, it is useful to stack multiple devices to achieve this goal. As described hereinabove, power maximization in a single channel can be achieved by varying the channel width, as well as constructing an array of five microchannels. In one embodiment, a plurality of 1 mm stackable channels were fabricated. Two single 1 mm wide microchannels were placed one on top of the other and Kapton® electrodes were placed in between each one in order to form a micro-fuel cell stack. The entire system was pumped with a single syringe pump. A clamp with the same dimensions as that used for 1 mm wide channels was employed.

Figure 10:
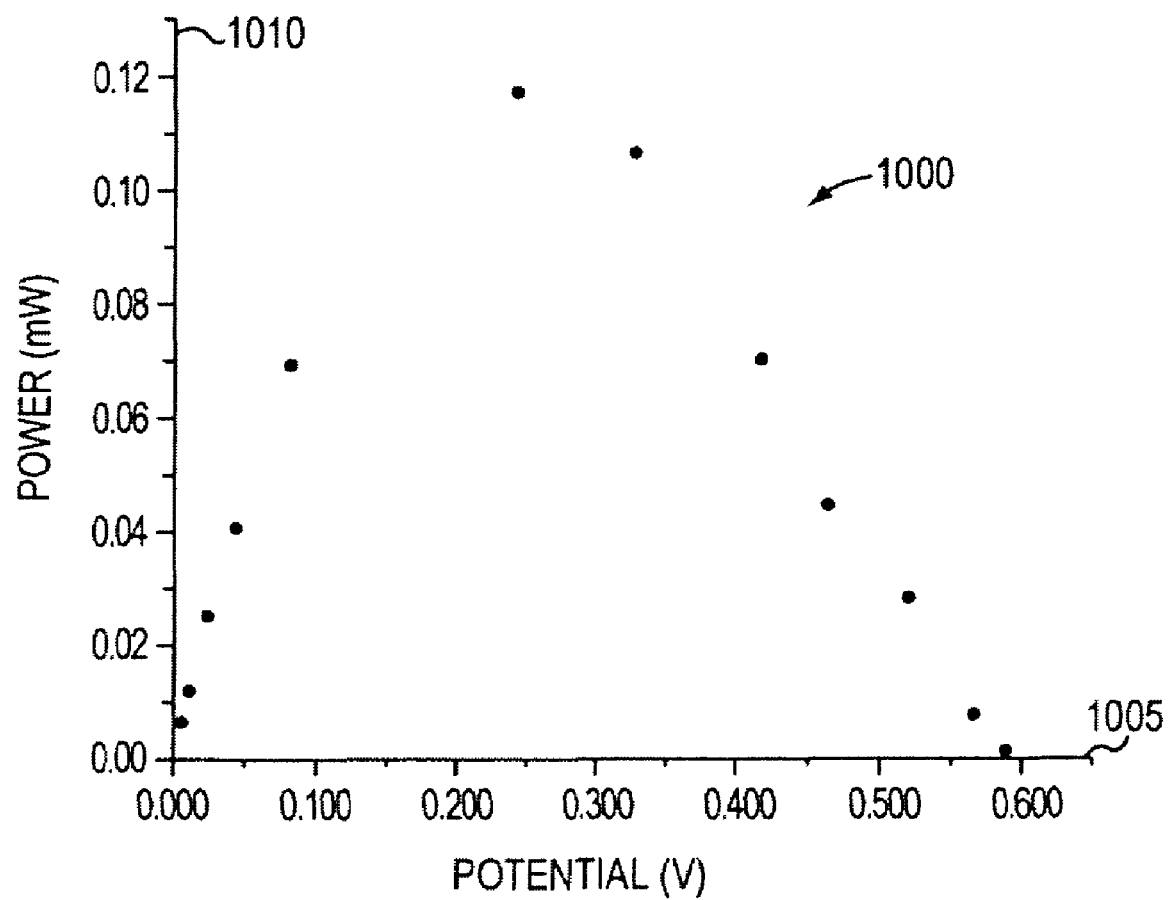
FIG. 10 is a diagram that shows the power output results for a stack of two 1 mm wide, 380 μm thick microchannel fuel cells according to principles of the invention.

FIG. 10 is a diagram 1000 that shows the power output results for a stack of two 1 mm wide, 380 µm thick microchannel fuel cells. Kapton® electrodes with 50 nm of Ta and 50 nm of Pt were used. The fuel component was 0.5 M formic acid in 0.1 M $H_2SO_4$ bubbled with $N_2$, and the oxidizer was 0.1 M $H_2SO_4$ aerated with $O_2$, at a flow rate of 1.5 ml/min.

The stack of two single 1 mm wide microchannels produced 116 µW, which can be compared to the nearly 45 µW produced from a single 1 mm wide microchannel. The two-channel stack produced twice the power of a single channel without increasing the physical volume of the $PM^2FC$ by a factor of two. These results demonstrate that planar microchannels can be stacked in order to increase power generation. This is a great advantage in terms of manufacturing high-powered compact devices, which can only be achieved with such a planar design. In other embodiments, different stacking geometries can be implemented, using stacks of multiple channels, stacks of wider channels, as well as stacks of arrays.

Figure 11:
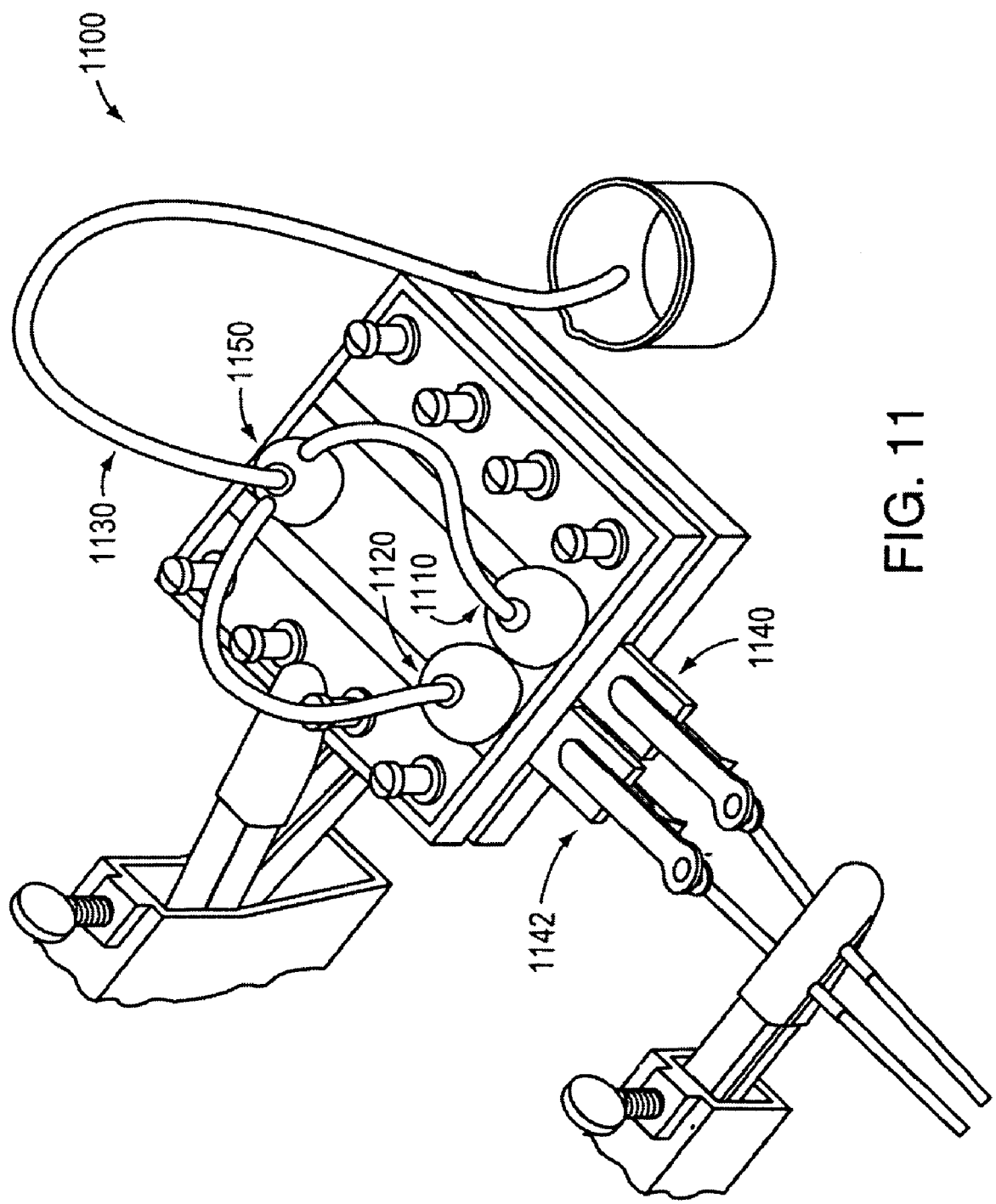
FIG. 11 is a picture of an assembled stacked fuel cell, according to principles of the invention.

FIG. 11 is a picture of an assembled stacked fuel cell 1100. In the embodiment shown in FIG. 11, there are two 1 mm wide by 5 cm long by 350 µm deep flow channels that have been assembled into a single stacked fuel cell structure. Many of the features of this embodiment are similar to features of an individual fuel cell, such as two inlets 1110 and 1120 for providing a first fluid comprising a fuel and a second fluid comprising an oxidizer, a single exit 1130 for removing spent fuel- and oxidizer-bearing fluids, the use of plexiglass upper and lower plates, the use of epoxy to connect the inlets 1110 and 1120 and the exit 1130 to the upper plexiglass support plate, and the use of nuts and bolts to hold the assembly together. The stacked fuel cell 1100 has some features that are different from a single channel fuel cell. For example, two electrical connections 1140 and 1142 are made at the end of the stacked fuel cell nearer to the viewer, and a single electrical connection 1150 is made at the other end of the assembled stacked fuel cell. The single electrical connection 1150 is made to both cells, at either the two anode electrodes or the two cathode electrodes. In an embodiment having more than two stacked cells, one could in principle connect all of the cathode electrodes (or all of the anode electrodes) in parallel to a single terminal. At the other end of the stacked cell as shown in FIG. 11, each of the remaining electrodes of polarity opposite to the commonly connected electrodes are connected individually to the external circuit, which connects to the common connection 1150 to provide a complete electrical circuit. One reason for connecting the plurality of fuel cells as described above is to permit testing of individual cells. In a stacked fuel cell structure having a plurality of fuel cells intended for operation to generate power, one may wish to use such an electrical connection topology so that each cell can operate at its optimal capacity, without regard to matching the individual currents generated (as is required in the case of series connection of cells) and without regard to matching the operating voltages (as required in the parallel connection of cells). The common connection 1150 can be thought of as representing a "ground" or "reference" potential in such a system, and all currents flowing through any of the plurality of fuel cells flow through the common connection 1150. In other embodiments, it is possible to connect the anode of a fuel cell in the stack to the cathode of the same fuel cell by way of an external circuit that is not connected to the external circuit of any other fuel cell in the stack. In some embodiments, wherein there are at least three stacked fuel cells, one can on principle use both kinds of external circuit topology (for selected ones of the fuel cells) at the same time. For other types of electrochemical cells, the same external circuit topology consideration can apply. If in some embodiment the voltages of two or more cells are substantially equal (or within a tolerable range), for example, fresh dry cell batteries, there is no objection to using a topology having parallel connection of such cells. However, for two (or more) cells with appreciable voltage differences, the cell having the smaller voltage will act as a load for the cell having the larger voltage, with an associated loss of efficiency. Similarly, there is in general no objection to connecting in series two (or more) cells having substantially equal current capacity or production, but the series connection of two cells having appreciably different current capacities will cause one to load the other, with loss of efficiency.

Figure 12:
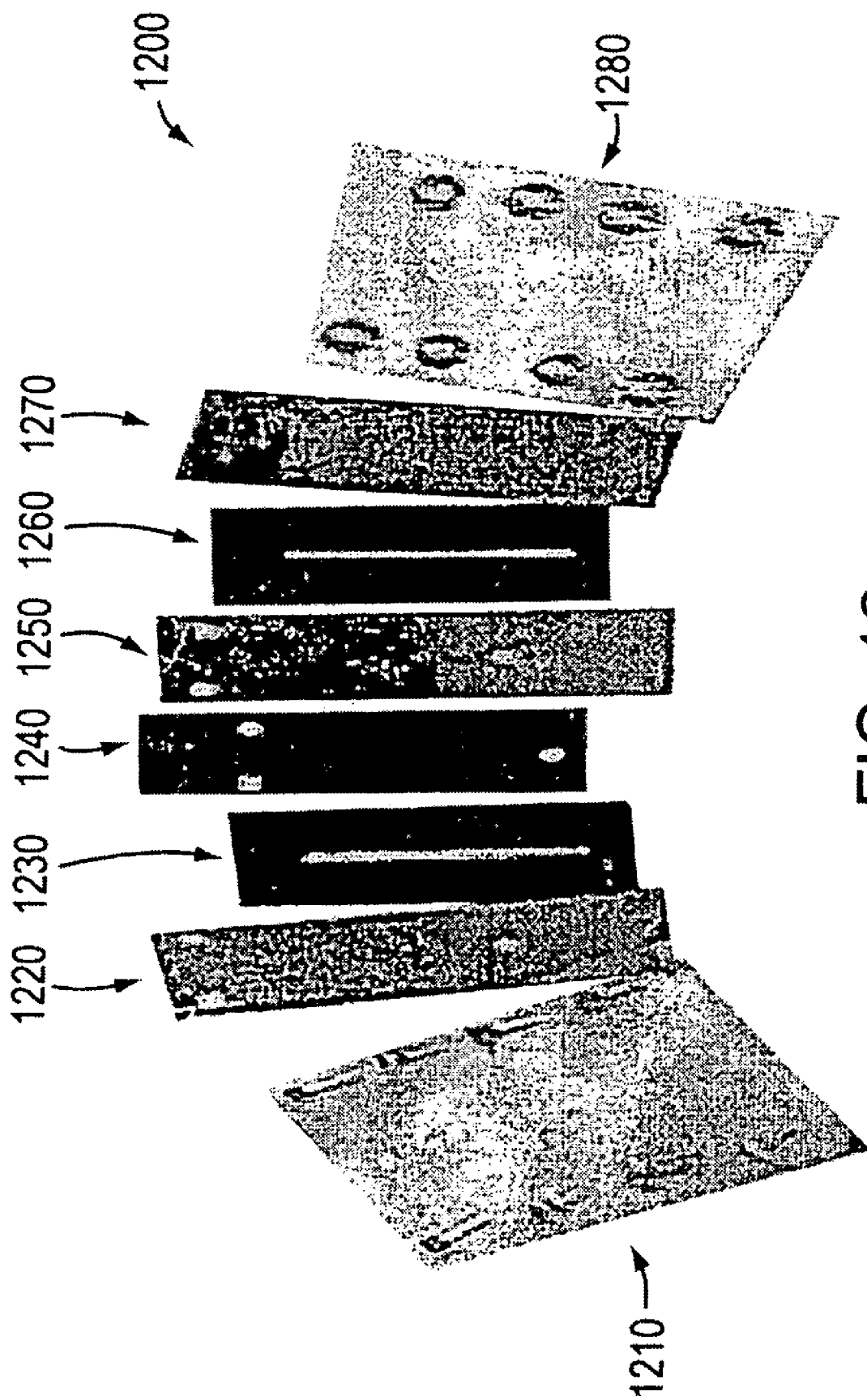
FIG. 12 is a picture of the stacked fuel cell of FIG. 11 shown in disassembled form.

FIG. 12 is a picture of the stacked fuel cell of FIG. 11 shown in disassembled form 1200. In FIG. 12, the top plexiglass plate 1210 and the bottom plexiglass plate 1280 are shown at the edges of the rendering. Comparison of electrodes 1220 and 1250 shows that both have defined therein at one end two apertures for the entry of fluids and have defined therein close to, but some distance from, the other end a single aperture useful for permitting spent fluid to exit he stacked fuel cell structure. Based on the relative positions of the apertures, it is apparent that electrodes 1220 and 1250 when assembled have their ends nearest the bottom of the figure extending beyond the plexiglass plates, so as to allow electrical connection to one or both of electrodes 1220 and 1250 at one end of the assemble stacked fuel cell structure. Electrodes 1220 and 1250 in one embodiment are fabricated by applying metal to one side of a Kapton sheet, which in the case of electrodes 1220 and 1250 is the side of the sheet facing toward the channel of the respective fuel cell of which each is an electrode.

Electrodes 1240 and 1270 are the electrodes of opposite polarity to electrodes 1220 and 1250, respectively. Electrode 1240 has defined therein at a distance from one end two apertures for the entry of fluids and has defined therein at the other end a single aperture useful for permitting spent fluid to exit he stacked fuel cell structure. Electrode 1270 is the lowest sheet in the stack and no fluid needs to pass through it; accordingly, there are no apertures defined in electrode 1270. Based on the relative positions of the apertures, it is apparent that electrodes 1240 when assembled have its end nearest the top of the figure extending beyond the plexiglass plates, so as to line up the two apertures near the top of the figure with the apertures in electrodes 1220 and 1250. When assembled in such a relative position, the end of electrode 1240 extending beyond the two apertures lies outside the end of the structure defined by the plexiglass plates, and allows electrical connection to the projecting end of electrode 1240 at the opposite end of the assemble stacked fuel cell structure as compared to electrodes 1220 and 1250. Electrode 1270 is assembled in registry with electrode 1240, and it too has one end projecting beyond the assembled plexiglass plates, at the same end as the projecting portion of electrode 1240. Electrodes 1240 and 1270 in one embodiment are fabricated by applying metal to one side of a Kapton sheet, which in the case of electrodes 1240 and 1270 is the side of the sheet facing toward the channel of the respective fuel cell of which each is an electrode. In such a configuration, electrodes 1240 and 1250 have their unmetallized sides is contact with each other.

Flow channels 1230 and 1260 complete the structure. Although it is not readily apparent from the images of channels 1230 and 1260 in FIG. 12, each channel also has two inlet apertures defined therein, which are assembled in registry with the apertures in the electrodes (and in registry with the apertures in the top plexiglass plate 1210). Channels 1230 and 1260 also comprise flow control structures similar to those previously described.

In operation, the two fluids (bearing fuel and oxidizer, respectively) enter by way of inlets 1110 and 1120, flow down through the two apertures at one end of the assembled stacked fuel cell, and portions of the flows enter the respective channels 1230 and 1260 by way of flow control structures, where parallel laminar sheets of the two fluids are formed. The fuel cell operation involves extraction of electricity from each cell by the respective electrode pairs (1220 and 1240 for one cell, and 1250 and 1270 for the other cell), which electricity flows through one or more external circuits. The spent fluids exit the stacked fuel cell by passing through the aligned single aperture at the end of the flow cells opposite the entry apertures.

In one embodiment, one can stack a plurality of the single 1 mm wide (or other convenient width) microchannels one on top of the other and pump the entire system with a single syringe pump, and can thus increase the power output of a single device without increasing the actual volume taken up by the clamping device. The clamp employed is the same as that for a single channel. Further modifications can be made in order to decrease the amount of electrode used by evaporating Pt on both side of the Kapton, in effect making the Kapton a dual anode and cathode (e.g., using one surface of the metallized Kapton as an anode for one cell, and using the other surface of the Kapton, metallized as appropriate for its intended function, as the cathode for the adjacent cell). In such a geometry, the Kapton extends beyond the plexiglass clamp at opposite ends of the structure, and one surface metallization extends outwardly at one projecting end, while the second surface metallization extends outwardly at the second projecting end, so that connection to the appropriate electrode at either end is simplified and short circuits are avoided. In instances where series connection of successive cells is desired, both metallizations can project beyond the plexiglass plate at a selected end (or at both ends), making the connection of one cell to the next in series a simple matter which can be accomplished with a simple "U"-shaped connector.

The PM$^2$FC design described herein has a number of advantages over other micro-fuel cells. It maximizes power production due to the large electrode areas that are available to come into contact with the fuel and oxidizer stream and is a versatile platform for the rapid configuration of fuel systems, electrodes, and microchannel designs. The design also allows microchannels to be stacked in order to increase power production from a single device. This design demonstrates that under laminar flow conditions, a PEM is not needed in order to produce a micro-fuel cell that generates power. With no PEM, the fabrication of the micro-fuel cell itself becomes facile, less expensive than current designs, as well as more easily optimized in terms of electrode development.

With electrode geometric areas in the range of 0.5 cm$^2$ to 2.5 cm$^2$, power generation of 0.045 mW-0.4 mW has been demonstrated, depending on the microchannel dimensions. The ability to fabricate microchannels of varying widths has been demonstrated, as well as the ability to stack microchannels. Using the planar design disclosed herein allows power production to be enhanced without greatly increasing the physical volume of the micro-fuel cell itself. Also, major changes to the PM$^2$FC platform are not needed to accommodate different microchannel configurations because both fuel and oxidizer are injected into the microchannel from the top (i.e., from a single face of the structure) and the platform can support a number of microchannel geometries. Maximum power in a minimum volume is one of the important goals when designing a micro-fuel cell and this design is conducive to achieving that goal.

The formic acid fuel cell system, employed here in one embodiment, has shown comparable performance to that reported previously for micro-, and macro-, fuel cell systems. The power production is limited by the kinetics of the formic acid oxidation, as well as the concentration of the $O_2$ at the cathode. In the embodiments described, the open circuit potential is largely limited by the overpotential for oxygen reduction. By modifying the anode electrode surface with adsorbed Bi adatoms, and subsequently catalyzing the formic acid oxidation, one can increase the open circuit potential of the fuel cell.

In other embodiments, other fuel oxidant combinations may be used, such as $H_2$, methanol and ethanol, as fuels, and oxygen or other oxidants. In other embodiments, incorporation of Pt and PtRu nanoparticles, as well as intermetallic micro-, and nano-, particles such as PtBi and PtPb can be used as anode catalysts. In various embodiments, different flow rates, microchannel thicknesses, and widths can be employed. In other embodiments, alternative substrates for the microchannels can be employed, such as polyimides, such as Kapton®, or poly(dimethylsiloxane) (PDMS). Both of these materials will facilitate the development of flexible planar devices that are very thin. There is a great emphasis on movement towards using polymers for micro-devices because of their ease of fabrication, cost efficiency, and physical flexibility. The device design described herein is conducive to fabrication of a flexible planar micro-fuel cell.

Some of the features of flow cells according to principles of the present invention are:
1. the laminar flow channel has an extremely high aspect ratio of width to depth; e.g., the laminar flow channel has a width and a depth, the width measured tangential to the interface between the two fluids flowing in contact through the laminar flow channel and orthogonal to the direction of flow, and the depth measured orthogonal to the width and the direction of flow, wherein the width is at least 10 times the depth. In one embodiment, the depth is less than 380 microns. In one embodiment, the depth is not more than 250 microns and the width is at least 5000 microns.
2. the electrodes are parallel to the interface between the two fluids in mutual contact flowing in the laminar flow regime;
3. the device contains two intake channels (called "transition channels") and carrying fluid from the external source (called "intake flows") to the laminar flow channel (LFC)) that actively transform each intake flow into a flow that:
   A) matches the cross-section of the laminar flow channel (so each fluid flows continuously and smoothly from its separate channel into the shared region);
   B) the direction of flow of the two intake channels is parallel to the direction of flow in the laminar flow channel; and
   C) for some distance prior to when the fluids are introduced into the laminar flow channel, the fluids separately have the appropriate cross section and orientation; and
4. the process used to make the present flow cell can be performed from a single side of the flow cell, so the process can be performed on a semiconductor chip if one wanted to integrate a fuel cell into a semiconductor device.

In addition to creating laminar flow prior to introducing fluid into the laminar flow channel, the flow control structure also modifies the cross-sectional dimensions (especially the width) and the orientation of the entering flow so that it matches the flow after the separation of the fluids ends at the taper's end.

In yet another embodiment of the present invention, the flow cell incorporates two flow transition channels situated between an inlet aperture into such channels and an outlet aperture out of such channels. The flow transition channel can be a channel in a substrate or a length of tubing or any other device which can transport a fluid in a controlled manner over a distance. The outlet aperture for each such channel introduces fluid into the laminar flow channel through the laminar flow channel's entrance aperture. A first flow transition channel carries a first fluid from a first source and has an inlet with a first cross section through which the first fluid enters the first flow transition channel, and has a first outlet with a first outlet cross section through which the first fluid is introduced into the laminar flow channel through a first laminar flow channel entrance aperture. A second flow transition channel carries a second fluid from a second source and has an inlet with a second cross section through which the second fluid enters the second flow transition channel, and has a second outlet with a second outlet cross section through which the second fluid is introduced into the laminar flow channel through a second laminar flow channel entrance aperture. The outlet cross sections of the first outlet and the second outlet can be, but do not have to be, identical.

In the laminar flow channel, the first fluid and the second fluid are flowing in parallel, preferably in laminar flow. Each fluid has a cross-section while flowing through the laminar flow channel which preferably remains constant: the first fluid has a first cross section and the second fluid has a second cross section. The inlet cross sections can have any cross-sectional dimensions and shape.

In this embodiment, in order to minimize turbulence caused by the introduction of the first fluid and the second fluid into the laminar flow channel, the first outlet cross section is substantially the same as the cross section of the first fluid as it flows through the laminar flow channel, and the second outlet cross section is substantially the same as the cross section of the second fluid as it flows through the laminar flow channel. Preferably, there is a gradual transition, respectively, of the cross sections of the first fluid and the second fluid in the first and the second transition channels from the first and second inlet cross sections to the first and second outlet cross sections (although the transition may not begin until near the outlets) so that laminar flow will be attained in the transition channels.

In one embodiment of this embodiment, for some short distance prior to the first and second outlets of the first and second transition channels, the respective cross sections of the first and second transition channels are close in size and shape to the outlet cross sections of the first and second outlets and there is a gradual transition of the cross section of the transition channels over the short distance to the first and second cross sections of the first and second outlets. In another embodiment of this embodiment, the first and second transition channels are substantially in parallel to each other over the short distance. In another embodiment of the preceding embodiment, the first and second transition channels are also parallel to the laminar flow channel for the short distance. The distance over which the transition channels are parallel to each other and/or to the laminar flow channel can be different from the distance over which the aforementioned gradual transition occurs and the distance over which the cross section is the same.

The first and second transition channels of this embodiment can be like those in the flow cell in FIG. 1 or can be tubes that are formed to have a gradual transition (at least close to the outlet) from an inlet cross section to the appropriate outlet cross section and which are attached to the entrance aperture of the laminar flow channel. The cross section of the transition channel can vary between the inlet and outlet, and the gradual transition of the transition channel cross section to the outlet cross section that matches the laminar flow channel fluid cross section can occur in the last section of the transition channel. All cross sections are understood to be taken orthogonal to the direction of flow of a fluid flowing through such cross section when the flow cell in operation.

In the flow cells of the present invention the electrodes are parallel to the contact interface 136 between the two fluids 132 and 134 and are located on opposite sides of the laminar flow channel. This has several advantages over electrodes that are not parallel to the contact interface 136.

One advantage of electrodes parallel to interface 136 is that the electrodes can cover an entire side of the laminar flow channel. There is no need to leave a gap between electrodes as must be done when two electrodes are situated on the same side of the laminar flow channel because in the present invention, the electrodes are separated by a distance corresponding to the sum of the thicknesses of the two fluids. This electrode placement may have an additional advantage in that the gap present between electrodes situated on the same side of a flow cell may represent a discontinuity that can cause turbulence or other disruption of the laminar flow. Another advantage is that the perpendicular distance between each point on the surface of the electrode and interface 136 can be made constant, although there may be reasons for varying the distance in some embodiments. Yet another advantage is that as the width (measured across the flow) of the interface 136 is increased, the distance of the interface 136 from the electrodes need not change, and the electrodes can also be increased in width without increasing their distance from such interface 136. If the electrodes are orthogonal to the interface 136 as in some prior art devices, any increase in the width of the interface between the two fluids will result an increase in the distance of some points on the interface to the electrodes.

In addition to using photolithography to make the flow cell of the present invention, other approaches can be used. For example, in one embodiment, the flow control structure can be formed by injection molding, pressing, thermoforming, or any other process appropriate to the material used, and then sandwiched between flat plates (perhaps using spacers) and fastened together to make a flow cell of the present invention.

Alternatively, portions (in some embodiments, in two halves) of the flow cell channel can be formed in each of the two plates and the flow control structure (and in some embodiments, also portions of the flow cell channel) can be formed in a third plate that is then sandwiched between the two plates in which the portions (or halves) of the flow cell channel were formed, and then fastened together such that the three pieces are sealed together. In an embodiment where the flow cell channel is entirely formed in the plates, the flow control structure can be a thin plate tapering from one side or both towards an aperture that defines the laminar flow channel portion of the flow cell.

In a further embodiment, the flow control structure is formed in the end of tubes that are connected to the laminar flow channel and introduce fluids into the laminar flow channel through the entrance aperture.

The configuration of the apertures for introduction of fluids ("intake apertures") into the flow cell shown in FIG. 1 is only one of many configurations of apertures. The intake apertures can be together on any side of the flow cell or can each be situated on a different side. The intake apertures can be holes through the plates into the flow control channel, or channels formed in the structure or can be a combination. The intake apertures should be situated so as to introduce fluids into the flow cell prior to the entrance aperture into the laminar flow channel, preferably as far away from the entrance aperture as possible.

The intake apertures can have any cross-sectional size or shape appropriate to the scale of the flow cell. One skilled in the art of flow dynamics will understand how to adjust the size and shape of the flow control structure to transform the dynamics of the fluid flow from the inlet aperture into laminar flow prior to and in the laminar flow channel. The length (along the flow) of the two separated sections (or channels) at the intake end of the flow cell may change based on the configuration of inlet apertures. For example, if the intake apertures are on opposite sides of the flow cell, there is no longer a need for one of the separated sections to be longer in order to allow one intake aperture to bypass the other separated section, and the two separated sections of the flow channel can be the same length.

In the present invention, the width of the contact interface between the two fluids flowing through the laminar flow channel can be much greater than the depth of the fluids. In one embodiment, the width is the dimension of the interface orthogonal to the direction of flow and tangential to the interface; the depth of each fluid is the perpendicular distance from the interface where the fluid contacts the other fluid to the wall or electrode surface. Having a large width of the contact interface can be advantageous because the distance between the contact interface and the electrode can be minimized to make proton transport quicker and more efficient. It also significantly increases the area over which reaction can occur since the reactions occur at the interface. Furthermore, by minimizing the depth, all of each fluid is closer to the interface where the reactions occur.

In the embodiments of the present invention, increasing the width of the channel increases the width of the interface, thereby increasing the overall area for reaction, and it does so without increasing the depth of the fluids or, in the case of a fuel cell embodiment, the distance from the electrode to the interface, because the electrode can be increased in width as the channel is widened. In prior art designs, a laminar flow fuel cell is described in which the width of the contact interface between the fluids is typically 20% or less of the depth of the fluids (the perpendicular distance from the interface to the wall constraining each fluid). In those devices, increasing the width of the channel does not affect the area of the contact interface between the fluids. Increasing the width of the channel only increases the depth of the fluids, the distance from the electrodes to the interface, and the amount of fluid that is physically distance from the interface. With the present invention, the width of the channels can be increased up to the limits of the material, perhaps only requiring that the flow cell be increased in length to allow for a sufficiently gradual transition of the cross section of the transition (intake) channels to match the size and orientation of the flows in the laminar flow channel. Such increases in width occur with no diminishment of performance.

In yet other embodiments, the invention provides one or more of the following:

1. A flow cell device wherein the side walls of the diffuser/condenser structures and the laminar flow channel in the same plane (in which the inlets must be stacked) and orthogonal to the top surface of the substrate in which said diffuser/condenser structures and said laminar flow channel are formed, and the width of the diffuser/condenser structures at their outlet end is at least a multiple of their depth, where the multiplier can be a selected one of 3, 5, 10, 20, 50 and 100;

2. A flow cell device wherein that portion of the outlet end of a first diffuser/condenser structure that is adjacent to a first entrance aperture into a laminar flow channel is parallel to a second diffuser/condenser structure that is adjacent to a second entrance aperture into said laminar flow channel, and is parallel to said laminar flow channel adjacent to the entrance apertures;

3. A flow cell device wherein there is a tapered boundary structure between two diffuser/condenser structures wherein the cross sections of the two diffuser/condenser structures gradually become equal until the boundary structure tapers to zero thickness at the entrance apertures and the entrance apertures sum in cross sectional area to the cross sectional area of the laminar flow channel and the widths of the diffuser/condenser structures and of the laminar flow channel are the same;

4. A flow cell device incorporating at least one diffuser/condenser structure which has a first width at an inlet end and a second width at its outlet end wherein the width at its outlet end is the same as the width of the laminar flow channel into which it introduces fluid;

5. A flow cell device incorporating at least one diffuser/condenser structure which has a first width at an inlet end and a second width at its outlet end wherein the width at its outlet end is the same as the width of the laminar flow channel into which it introduces fluid, and wherein the ratio of the width to depth of said diffuser/condenser structure is a selected one of 3:1, 5:1, 10:1, 20:1, 50:1 and 100:1;

6. A flow cell device in a thin substrate wherein the interface between the fluids in the flow cell is parallel to the surface of the thin substrate;

7. A flow cell device in a thin substrate wherein the interface between the fluids in the flow cell is parallel to the surface of the thin substrate, wherein the substrate is a wafer; and 8. A flow cell device in a thin substrate wherein the interface between the fluids in the flow cell is parallel to the surface of the thin substrate, wherein the substrate is a thin polymer sheet.

In one embodiment, the flow cell of the present invention has a section in which the fluids flow apart in two separate channels and a laminar flow channel in which the fluids are in contact. These separate channels each have an inlet end and an outlet end. Fluid enters these channels through the inlet from some external source and exits at the outlet end of the channels into the entrance apertures of the laminar flow channel. In some embodiments, the two separate channels act as diffuser/condenser structures, mechanically diffusing or condensing the fluids so that the fluid's cross section at the outlet end is different from that at the inlet end. In some embodiments, the diffuser/condenser structure functions also to insulate the inlet flow from the outlet flow.

In a flow cell, it is advantageous for the two fluid streams entering the flow cell to have the same width as the flow cell itself. If the widths are the same, the flows will tend to be stable and maintain their orientation to each other as they enter and flow through the flow cell. If the widths of the two incoming streams are different from each other or are different from the width of the flow cell, the orientation of the flows can be unstable and the fluids may reorient themselves to find the path of least resistance to the exit of the flow cell, for instance from a side-by-side orientation into a top and bottom orientation.

In some embodiments of the present invention, the diffuser/condenser structures of the flow cell of the present invention actively modify the width of the incoming fluid streams so that they match the width of the laminar flow channel as the fluid streams enter the laminar flow channel.

This active modification allows the dimensions of the inlet to the flow cell to be of any convenient dimension. Without this active modification, in order to achieve the stacked flow of two thin and wide streams oriented along their wide dimension, it would be advantageous for the inlet aperture to have the same thin and wide cross section as the flow through the laminar flow channel. The height of the diffuser/condenser structures do not need to equal the height of the half cell occupied by each of their respective fluids, nor do the streams have to enter the laminar flow channel in parallel but under certain conditions can even enter in opposition to each other. In some embodiments of the present invention, the diffuser/condenser structures modify the fluid stream until its width is three, five, ten and more than ten times its depth, so that the interface area of the two liquids is as wide, and therefore as big, as possible.

However, under some conditions such as rapid flow of the fluids, it is advantageous if the diffuser/condenser structures, in addition to changing the width of the input streams to match the width of the laminar flow channel, also change the orientation of the two fluids into an orientation parallel with each other and preferably parallel to the laminar flow channel. It is advantageous as well if the parallel orientation is maintained for some distance on either side of the entrance apertures from the diffuser/condenser structures into the laminar flow cell, perhaps 100s of microns or a millimeter or several millimeters. It is advantageous to have such parallel orientation maintained over as long a distance as is practical given the dimensions of the flow cell.

It is also advantageous under some conditions, such as rapid fluid flow, for the two fluids to be brought into contact gradually. In the present invention, in some embodiments there is a flow control structure which separates the two diffuser/condenser structures and gradually brings the fluids together. In some embodiments the flow control structure is tapered on both sides; in other embodiments it is tapered only on one side. In some embodiments it tapers down to zero thickness. Under some conditions it is advantageous for the flow control structure to taper gradually to zero so that the two streams in essence meet as two parallel streams in the laminar flow channel and there is little of no inertia in either fluid stream in the direction of the other stream. In some embodiments, the flow control structure is formed so that the two diffuser/condenser structures gradually change in cross sectional dimensions until their cross sectional dimensions are identical and the sum of their heights is equal to the height of the laminar flow channel and their widths are equal to each other and the width of the laminar flow channel. In some embodiments, the flow control structure is formed so that the two diffuser/condenser structures gradually change in cross sectional dimensions until their cross sectional dimensions are identical and when the streams meet their cross sections sum up to the cross section of the laminar flow channel.

In the embodiment of the present invention shown in FIG. 1, the sides of the diffuser/condenser structures are in the same plane with each other and the side walls of the laminar flow channel, and the cross section of the diffuser/condenser structures changes from the inlet aperture cross section to a total, summed cross section equal to that of the laminar flow channel. In some embodiments, the flow control structure is tapered so that the fluids enter the laminar flow channel as two parallel streams, the size of which is the same before entering as after entering. This embodiment of the present invention incorporates many of the features described herein which are advantageous under conditions of rapid flow. The two streams are also modified so that their width is many times their depths to provide for a large interface area between the two fluids.

Another feature of the flow cell of the present invention is that it can be manufactured using top down techniques in a thin substrate (such as a wafer or a sheet of polymer). The channels introducing fluid into the laminar flow channel (the diffuser/condenser structures) are oriented one on top of the other relative to the surface of the substrate, not side-by-side as in prior art flow cells. As a result, the electrodes in the fuel cell embodiment are parallel to the surface of the substrate which makes them easy to manufacture.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A fuel cell structure useful for providing laminar flow regimes in a plurality of fluids flowing in mutual contact in a laminar flow channel, comprising:

a laminar flow channel defined within said fuel cell structure;

at least two entrance apertures defined within said fuel cell structure, a first entrance aperture configured to admit a first fluid into said laminar flow channel and a second entrance aperture configured to admit a second fluid flow into said laminar flow channel, said first entrance aperture and said second entrance aperture configured to provide respective entry of said first fluid flow and said second fluid flow parallel to each other prior to the laminar flow channel;

a flow control structure situated adjacent said at least two entrance apertures for admitting said fluid flows into said laminar flow channel, said flow control structure configured to cause each of said fluid flows to flow in a laminar flow regime within said laminar flow channel;

at least one exit aperture defined within said fuel cell structure for permitting said fluids to exit said laminar flow channel;

a first diffuser/condenser structure having a first inlet though which the first fluid enters from a first external source and a first outlet from which the first fluid exits into a laminar flow channel; and a second diffuser/condenser structure having a second inlet through which the second fluid enters from a second external source and a second outlet from which the second fluid exits into a laminar flow channel;

wherein said fuel cell structure is configured to provide laminar flow regimes in two fluids flowing in mutual contact in said laminar flow channel and wherein the first and second inlets and first and second outlets respectively have substantially different cross-sectional dimensions and further wherein the width of the first and second outlets are equal to each other and to the width of the laminar flow channel, both as measured parallel to the interface between the first and second fluids at the laminar flow channel's first and second entrance apertures.

2. The laminar flow fuel cell of claim 1 wherein the first and second diffuser/condenser structures are separated by the flow control structure.

3. The laminar flow fuel cell of claim 1 wherein the first and second diffuser/condenser structures are parallel to each other and orthogonal to the interface between the two fluids in the laminar flow channel, wherein the two fluids after exiting from the first and second outlets flow parallel to each other prior to contacting each other at the interface between the two fluids in the laminar flow channel.

4. The laminar flow fuel cell of claim 2 wherein the flow of a first fluid at the outlet end of the first diffuser/condenser structures is substantially parallel to the flow of a second fluid at the outlet end of the second diffuser/condenser structure.

5. The laminar flow fuel cell of claim 4 wherein the flow control structure is tapered gradually so that the flow of the first fluid and the second fluid are substantially parallel immediately prior entering the laminar flow channel through the first and second entrance apertures.

6. The laminar flow fuel cell of claim 1 wherein the flow of a first fluid at the outlet end of the first diffuser/condenser structures is substantially parallel to the flow of a second fluid at the outlet end of the second diffuser/condenser structure.

7. The laminar flow fuel cell of claim 1 wherein the flow control structure is tapered gradually so that the flow of the first fluid and the second fluid are substantially parallel immediately prior entering the laminar flow channel through the first and second entrance apertures.

* * * * *